(12) United States Patent
Teng et al.

(10) Patent No.: US 11,178,554 B2
(45) Date of Patent: Nov. 16, 2021

(54) METHOD AND INFORMATION EXCHANGE MECHANISM FOR FULL DUPLEX TRANSMISSION

(71) Applicant: NOKIA TECHNOLOGIES OY, Espoo (FI)

(72) Inventors: Yong Teng, Beijing (CN); Deshan Miao, Beijing (CN); Kari Veikko Horneman, Oulu (FI)

(73) Assignee: Nokia Technologies Oy, Espoo (FI)

( * ) Notice: Subject to any disclaimer, the term of this patent is extended or adjusted under 35 U.S.C. 154(b) by 109 days.

(21) Appl. No.: 16/492,035

(22) PCT Filed: Mar. 9, 2017

(86) PCT No.: PCT/CN2017/076182
§ 371 (c)(1),
(2) Date: Sep. 6, 2019

(87) PCT Pub. No.: WO2018/161319
PCT Pub. Date: Sep. 13, 2018

(65) Prior Publication Data
US 2020/0107202 A1    Apr. 2, 2020

(51) Int. Cl.
*H04W 24/02* (2009.01)
*H04L 5/00* (2006.01)
*H04L 5/14* (2006.01)

(52) U.S. Cl.
CPC .......... *H04W 24/02* (2013.01); *H04L 5/0062* (2013.01); *H04L 5/14* (2013.01)

(58) Field of Classification Search
None
See application file for complete search history.

(56) References Cited

U.S. PATENT DOCUMENTS

2008/0107050 A1    5/2008  Paulitsch et al.
2009/0296609 A1*  12/2009  Choi ................... H04W 72/121
                                                            370/281
(Continued)

FOREIGN PATENT DOCUMENTS

CN    103975637 A    8/2014
CN    105376841 A    3/2016
(Continued)

OTHER PUBLICATIONS

Hong et al. "Applications of Self-Interference Cancellation in 5G and Beyond" IEEE Communications Magazine Feb. 2014 (Year: 2014).*

(Continued)

*Primary Examiner* — Jeffrey M Rutkowski
*Assistant Examiner* — Basil Ma
(74) *Attorney, Agent, or Firm* — Brake Hughes Bellermann LLP

(57) ABSTRACT

According to an aspect, a method comprises detecting a need to change a duplex mode in a first network node from half duplex to full duplex, determining relevant neighboring network nodes of the first network node, determining duplex pairing information of the first network node, wherein the duplex pairing information of the first network node comprises duplex information of the relevant neighboring network nodes, the duplex information comprising at least information on a current duplex mode of a corresponding neighboring network node, using the duplex pairing information to determine duplex modes of the relevant neighboring network nodes, if all the relevant neighboring network nodes operate in half duplex mode, causing changing the duplex mode of the first net-work node to full duplex; and in response to the causing changing the duplex mode, (Continued)

causing updating information on a current duplex mode of the first net-work node.

19 Claims, 16 Drawing Sheets

(56) References Cited

U.S. PATENT DOCUMENTS

| | | | |
|---|---|---|---|
| 2013/0223294 A1 | 8/2013 | Karjalainen et al. | |
| 2016/0218769 A1* | 7/2016 | Chang | H04B 1/525 |
| 2017/0302337 A1* | 10/2017 | Liu | H04B 7/005 |
| 2017/0324535 A1* | 11/2017 | Furuskar | H04L 5/14 |
| 2020/0305157 A1* | 9/2020 | Kim | H04W 74/0833 |

FOREIGN PATENT DOCUMENTS

| | | |
|---|---|---|
| WO | 2014205288 A1 | 12/2014 |
| WO | 2016099352 A1 | 6/2016 |
| WO | 2016106604 A1 | 7/2016 |

OTHER PUBLICATIONS

European Search Report for European Patent Application No. 17899836.5, dated Oct. 27, 2020, 16 pages.
International Search Report and Written Opinion for Application No. PCT/CN2017/076182, dated Dec. 1, 2017, 8 pages.

* cited by examiner

METHOD AND INFORMATION EXCHANGE MECHANISM FOR FULL DUPLEX TRANSMISSION

CROSS-REFERENCE TO RELATED APPLICATIONS

This application is a national stage entry of International Application No. PCT/CN2017/076182, filed Mar. 9, 2017, entitled "METHOD AND INFORMATION EXCHANGE MECHANISM FOR FULL DUPLEX TRANSMISSION" which is hereby incorporated by reference in its entirety.

TECHNICAL FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The fifth generation cellular systems (5G) aim to improve the throughput by a factor of 1000, which is very challenging, especially considering the scarcity of spectrum at low frequency bands. In order to reach this goal, it is important not only to exploit the higher frequencies such as millimeter wave frequencies but also to utilize the more conventional, lower frequencies as efficiently as possible. Full duplex (FD) technique may provide one solution for improving this efficiency, thanks to the promise of nearly doubled channel capacity compared to traditional half duplex (HD) systems. FD communication was long believed impossible in wireless system design due to the severe self-interference within the same transceiver. However, tremendous progress in self-interference cancellation has been achieved recently and the feasibility of FD technique for short-range communications has been gradually verified. As network densification in 5G significantly increases the variation in traffic loads between different cells, technologies for small cell networking enabling also bidirectional transmission are especially needed in 5G. However, from the network perspective, if full duplex transmission is applied to all the cells, heavy inter-cell interference (ICI) may be introduced.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

Figure 1:
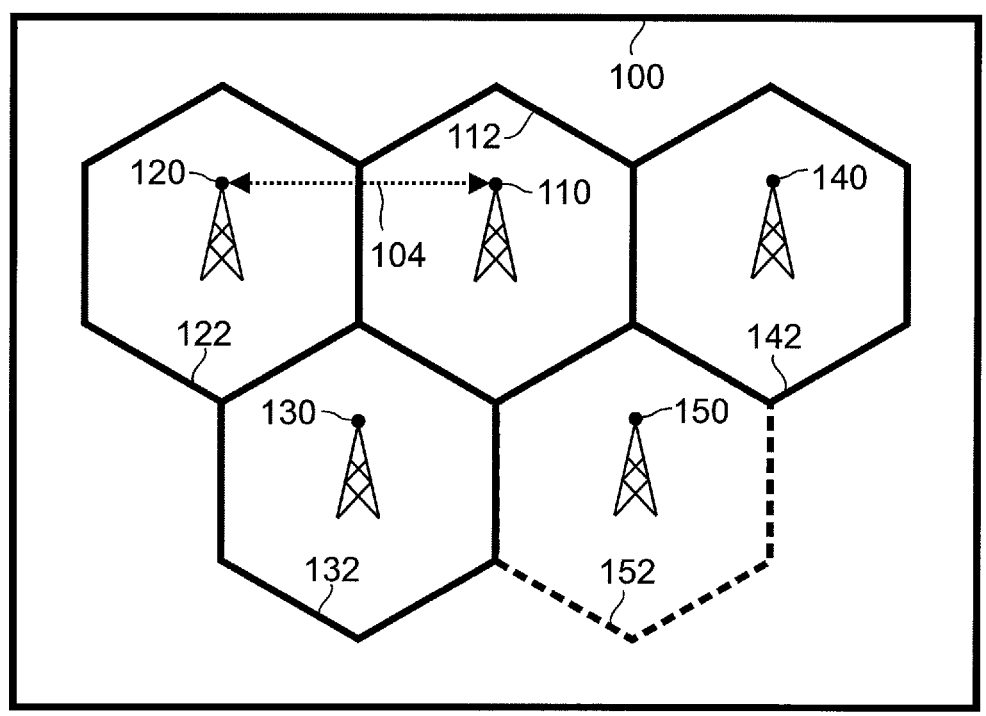
FIGS. 1 and 2 illustrate wireless communication scenarios to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments described may be implemented in a radio system, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunications System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in cooperation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (for example IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise, in addition to standard high-volume servers, switches and storage devices, one or more virtual machines running computer program codes using standard or general type servers instead of customized hardware. Cloud computing or cloud data storage may also be utilized. In radio communications, this may mean that node operations are carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system 100 to which some embodiments, based on distributed (de-centralized) scheme, of the invention may be applied. The system 100 may be a wireless communication system composed of one or more radio access networks of access nodes 110, 120, 130, 140, 150, each providing and controlling a respective cell or cells 112, 122, 132, 142, 152. The access nodes may provide one or more terminal devices (user equipment, UEs), not shown, with wireless access to other networks such as the Internet, either directly or via a core network.

In a wireless system, an access node provides and manages one or more cells. From another point of view, the cell may define a coverage area or a service area of the access node. The cell may be, for example, a macro cell or a small cell (a micro, femto, or a pico cell). Although in FIG. 1 the cells 112, 122, 132, 142, 152 are drawn as separate, they may be at least partially overlapping with each other. The access node may equally be called a base station.

In FIG. 1, the cells 112, 122, 132, 142, 152 may be small cells or macro cells or a combination of small cells and macro cells. For example, the access node 112, 122, 132, 142, 152 may be an evolved Node B (eNB) as in the LTE and LTE-A, a next generation node B (gNB), like in 5G, an access point of an IEEE 802.11-based network (Wi-Fi or wireless local area network, WLAN), a radio network controller (RNC) as in the UMTS, a base station controller (BSC) as in the GSM/GERAN, Access Point (AP), or any other apparatus capable of controlling wireless communication and managing wireless resources within a cell. Typically the wireless communication is radio communication. For 5G solutions, the implementation may be similar to LTE-A, as described above. In some scenarios, one or more local area access nodes may be arranged within a control area of a macro cell access node. The local area access node may provide wireless access within a sub cell that may be comprised within a macro cell. Typically, the sub cell provides a hot spot within the macro cell. The operation of the local area access node may be controlled by an access node under whose control area the sub cell is provided. In some scenarios, a plurality of local area access nodes may be controlled by a single macro cell access node.

In an embodiment, the cells 112, 122, 132, 142, 152 are small cells of different types (a micro, a femto, or a pico cell) forming a dense network. Moreover, the traffic volume of each small cell 112, 122, 132, 142, 152 may differ considerably.

In the case of multiple access nodes in the communication network, the access nodes may be connected to each other with an interface 104. LTE specifications call such an interface an X2 interface. In IEEE 802.11 networks, a similar interface is provided between access points. Other wired or wireless communication methods between the access nodes may also be possible. Though only the interface 104 between two access nodes 110, 120 is shown in FIG. 1, it should be appreciated that each of the access nodes 110, 120, 130, 140, 150 may be connected to any other access node via a similar interface.

Each of the access nodes 110, 120, 130, 140, 150 may operate in a half duplex mode or full duplex mode. When an access node is powered on, for a period there is usually no need for handling heavy traffic volumes or for an optimized traffic adaptation in downlink and uplink, the traffic volume being a measure of the amount of data transmitted/received by the access node over a certain period of time (e.g., 24 hours). Therefore, by default, each access node operates in the half duplex mode and the full duplex mode is used only in special circumstances, for example, if the capacity of the access node, i.e., the upper limit on the achievable rate at which information can be reliably transmitted from and/or to the access node, needs to be increased or if there is relatively symmetric traffic volume in downlink and uplink. Relative symmetry of the traffic volume implies that close to equal amount of data is transmitted to the terminal devices (downlink) and received from the terminal devices (uplink) by the access node. The main reason for not using the full duplex mode, which would offer higher capacity, for all the cells simultaneously lies in the interference behavior of the network.

Let us consider an embodiment where the cells 112, 122, 132, 142, 152 are small cells located in a dense manner. Moreover, the neighboring access node 120 is operating in full duplex mode in this example. Significant inter-cell interference (ICI) may be induced to the access node 110 in such a case. The uplink users of the neighboring cells may cause homogeneous ICI (i.e., effects of the ICI being substantially uniform over the cell) while the neighboring access nodes themselves may cause heterogeneous ICI (i.e., effects of the ICI being substantially nonuniform over the cell). If the access node 110 switches to full duplex mode, strong additional heterogeneous ICI component and self-interference within the same transceiver are introduced in addition to the aforementioned interference phenomena which may lead to severely compromised performance. While the homogeneous ICI can be mitigated using existing inter-cell interference coordination (ICIC) schemes in LTE or LTE-A systems and multiple active and passive self-interference suppression schemes have been introduced in recent years, the heterogeneous ICI cannot be easily mitigated. Therefore, the question of when and where to use full duplex mode in the network is not an obvious one and there is a clear need for a solution enabling use of full duplex transmission that takes the ICI into account. Before the access node 110 may switch to full duplex mode, the access node 110 should first somehow make sure that full duplex mode is not in use in the neighboring access nodes 120, 130, 140, 150 and if it is in use, possibly make an assessment on the level of need for the full duplex transmission for these access nodes compared to the access node 110 in order to ensure that the ICI does not compromise the operation of the communications system and largest is possible benefit may be attained from the full duplex mode operation.

All the neighboring access nodes and cells may not be equally significant in view of the ICI caused to the access node 110 due to the differences in traffic volumes and types of the cells. Therefore, in order to minimize the unnecessary traffic load in the communications system, the neighboring access nodes/cells may be divided to relevant and nonrelevant neighboring access nodes/cells and only the relevant neighboring access nodes may be involved in decision making processes where the ICI is of importance. Determining the relevance may be based on a set of rules stored to a memory of the entity running an ICI-critical process, e.g., the access node 110. The rules may give pre-defined thresholds for one or more quantities describing the link performance, for example, interference strength, path loss between cell sites and/or reference signal power from the neighboring access node to the access node 110 which may be measured via orthogonal downlink reference signal in the neighboring cells and muted uplink transmission. For example, the rules may specify that a neighboring access node is a relevant neighboring access node in terms of ICI if a path loss for a link between the two access nodes is lower than a pre-defined path loss threshold and the signal-to-interference ratio for the link is lower than a pre-defined signal-to-interference ratio. In the exemplary scenario of FIG. 1, the access node 150 may be a non-relevant neighbor of the access node 110 in view of the ICI induced. Each access node 110, 120, 130, 140, 150 may maintain information on the duplex mode and link performance (including ICI information) relating to the access node itself as well as to the relevant neighboring access nodes in a memory.

Figure 2:
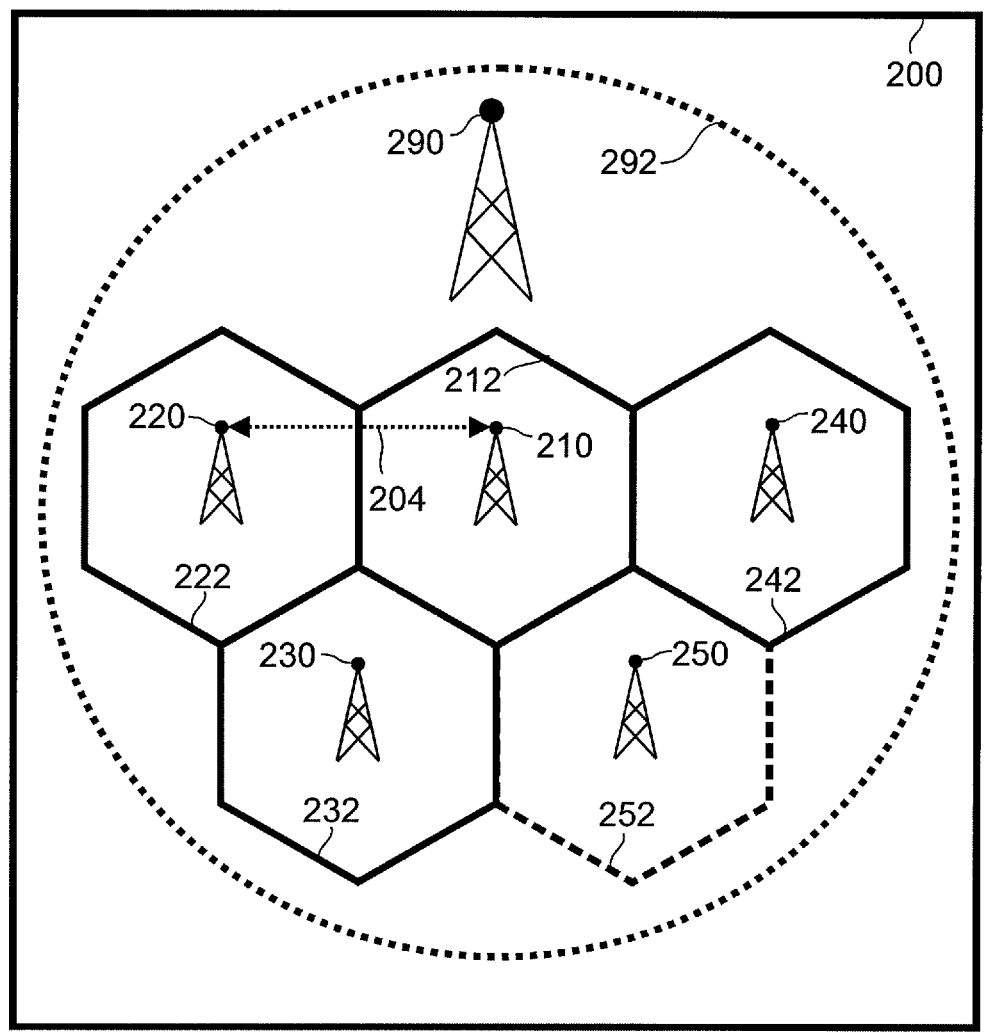

FIG. 2 illustrates another, alternative example of a communications system 200 to which some embodiments, based on centralized scheme, of the invention may be applied. The communications system of FIG. 2 is similar to the one illustrated in FIG. 1 with the access nodes 210, 220, 230, 240, 250 corresponding to the access nodes 110, 120, 130, 140, 150 of FIG. 1 and the cells 212, 222, 232, 242, 252 corresponding to the cells 112, 122, 132, 142, 152 of FIG. 1. The above description related to FIG. 1 also applies to FIG. 2 and the related embodiments unless otherwise stated.

The difference between the communications systems of FIG. 1 and FIG. 2 lies in the additional access node 290. The access node 290 acts as a central control entity for the other access nodes 210, 220, 230, 240, 250 with which it may communicate via interfaces (e.g., X2 interface) as described above in relation to access nodes of FIG. 1. The control access node may have control over the access nodes in a certain control area 292. The processes which are run by each access node by themselves in communication with the neighboring access nodes (that is, in a distributed manner) in the communications system of FIG. 1 may be run in a centralized manner using the control access node 290. For example, the control access node 290 may determine the relevant neighboring access nodes for each of the access nodes 210, 220, 230, 240, 250 based on data provided by the access nodes using a set of rules stored to a memory of the control access node 290 as well as controlling the assigning of duplex modes for the access nodes 210, 220, 230, 240, 250 using processes which will be described below in relation to FIG. 12. In some embodiments, the access nodes 210, 220, 230, 240, 250 may determine their relevant neighboring access nodes themselves and forward this information to the control access node 210 either periodically or along with the query for requesting the use of full duplex mode. The control access node 290 may maintain information on the duplex mode and link performance (including ICI information) relating to all the access nodes 210, 220, 230, 240, 250 as well as information on the relevant and nonrelevant neighbors of each access node 210, 220, 230, 240, 250.

Figure 3:
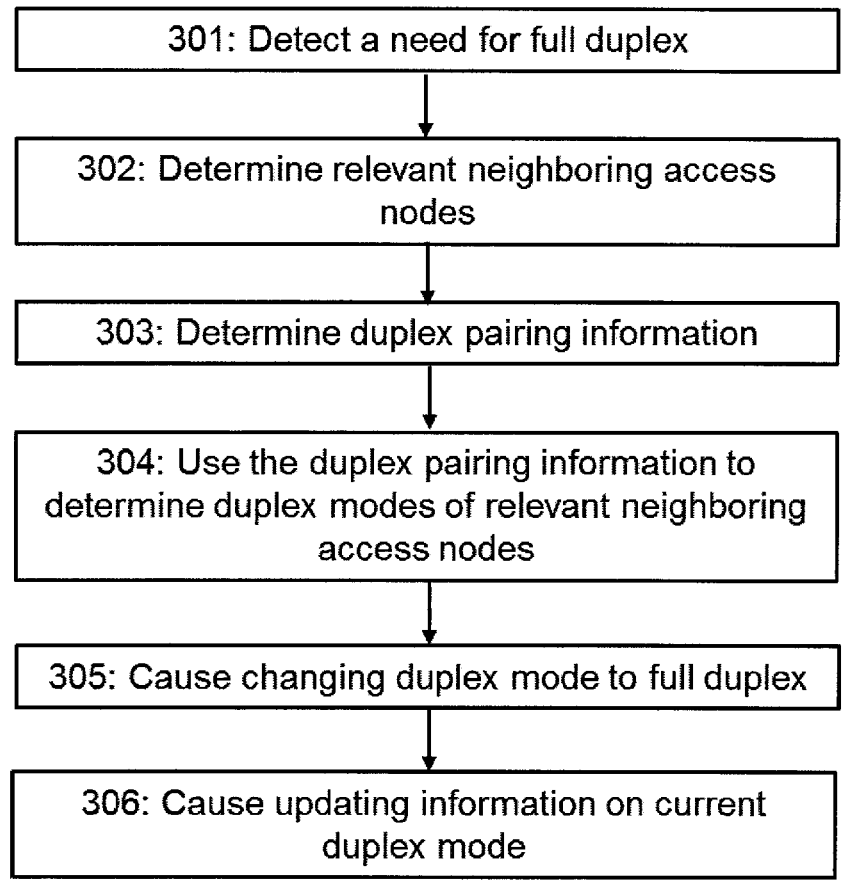
FIG. 3 illustrates a flow diagram of configuring full duplex transmission for an access node.

FIG. 3 illustrates a process executed by an access node, for example, by the access node 110 in the communications system 100 of FIG. 1, for enabling full duplex transmission for the access node according to an embodiment, based on the distributed scheme, of the invention. It is assumed that the access node is operating initially in the half duplex mode. First, the access node detects, in block 301, a need for a duplex mode change from half duplex to full duplex. For example, the access node may have a sudden need for additional capacity. In such a case, the capacity exceeding certain threshold may, for example, trigger the process. The access node determines, in block 302, the relevant neighboring access nodes, for example, based on a set of rules stored to a memory as described above. In some embodiments, the relevant neighboring access nodes may not be determined every time the process is executed. Previously determined and stored information on relevant neighboring access nodes may be used instead. Knowing the relevant neighboring access nodes, the access node determines, in block 303, the duplex pairing information of the access node. The duplex pairing information of the access node comprises duplex information of the relevant neighboring access nodes. The duplex information, in turn, comprises at least information on the duplex mode of each relevant neighboring access node. The access node uses, in block 304, the duplex pairing information to determine the duplex modes of the relevant neighboring access nodes. In this example, none of the neighboring access nodes are operating in full duplex mode. In response to this, the access node causes changing, in block 305, duplex mode to the full duplex mode. It should be obvious that if the access node determines, in block 302, that the access node does not have any relevant neighboring access nodes, the access node effectively ignores the steps in block 303 and 304 and directly causes, in block 305, changing duplex mode to full duplex. Finally, the access node causes, in block 306, updating the information on the current duplex mode of the access node in the communications system.

Alternatively, FIG. 3 illustrates a process executed by a control node in an embodiment based on the centralized scheme, for example by the control access node 290 in the communications system 200 of FIG. 2 for enabling full duplex transmission for the access node 210. As the process progresses in the same way in the control access node as described above for the access node in a communications system based on the distributed scheme, the process for the control access node will not be repeated here for brevity. However, it should appreciated that the detailed execution of each step of FIG. 3 may differ depending on whether the process is run in a distributed scheme access node or in a control access node of the centralized scheme. For example, instead of changing its own duplex mode, the control access node sends, in block 305, a request for changing the duplex mode to the access node. Another example includes that, in block 301, a need for a duplex mode change from half duplex to full duplex is detected because a corresponding request is received from the access node. The differences between the distributed and centralized schemes will become apparent in the descriptions of the following, more detailed embodiments of the invention.

Figure 4:
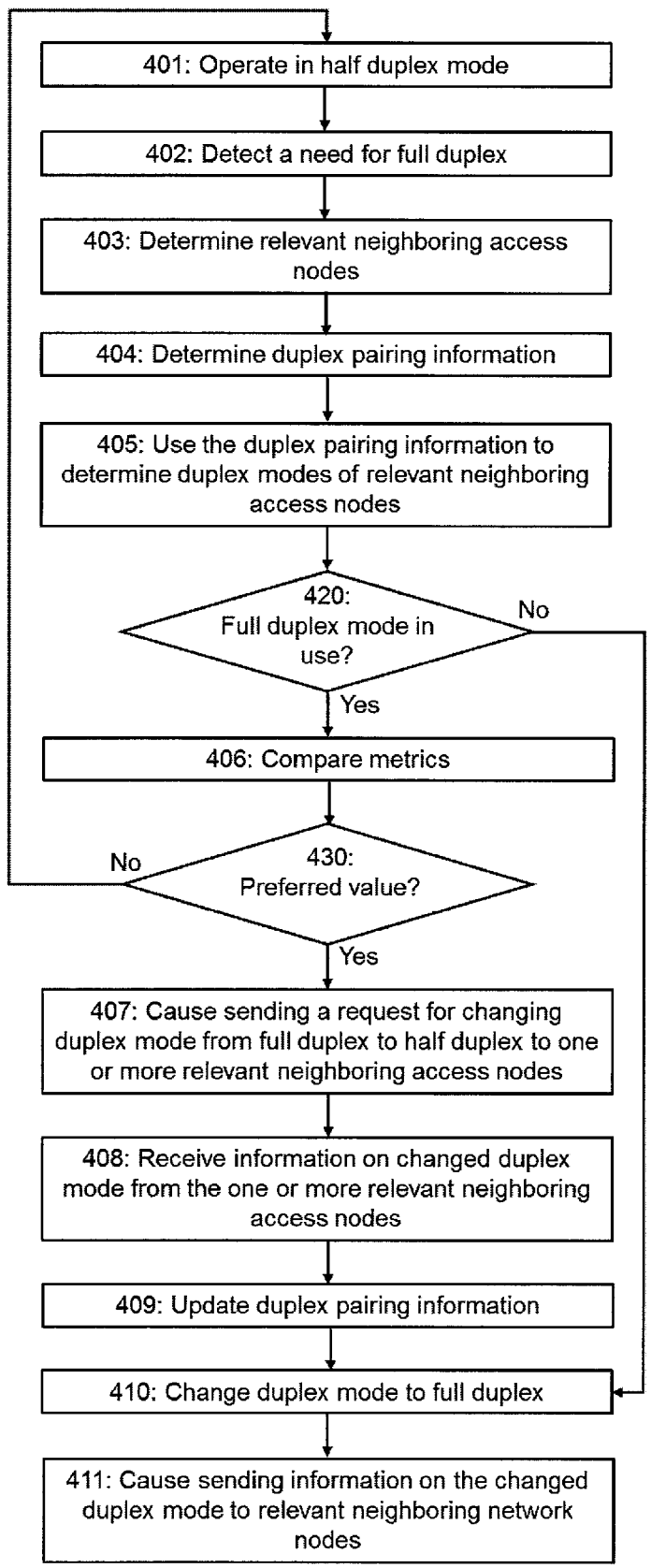
FIGS. 4-8 illustrate flow diagrams of configuring full duplex transmission for an access node from the point of view of the access node.

FIGS. 4 to 11 illustrate embodiments of the invention relating to the distributed scheme only while the centralized scheme is discussed in detail in relation to FIGS. 12 to 16. Accordingly, an embodiment of the process executed by an access node implementing the distributed scheme, for example by the access node 110 in the communications system 100 of FIG. 1, for enabling full duplex transmission for the access node 110 is illustrated in FIG. 4. As opposed to the example illustrated in FIG. 3, the relevant neighboring access nodes may already be operating in full duplex mode in this example. Furthermore, the duplex information of each access node also comprises a bidirectional transmission preference metric which provides quantitative information on how high the need for the full duplex mode is for the access node, that is, how beneficial it would be for the access node to switch to full duplex mode operation. The bidirectional transmission preference metric may be, for example, a neighboring density metric, a metric for uplink/downlink traffic symmetry or a combination of said metrics. The neighboring density metric is used to quantify how densely the cells around the cell of interest are deployed. For example, the neighboring density metric may be defined as the number of the neighboring cells or the relevant neighboring cells or as the total interference level from all the neighboring cells measured by the access node relative to the available transmission power level of the access node. The metric for uplink/downlink traffic symmetry may be defined, for example, as a ratio of the uplink and downlink traffic volumes. To give examples of the combination of metrics, neighboring density metric for one cell may be multiplied/divided with its downlink/uplink traffic symmetry or a weighted sum of the two metrics or any other weighted combination of the two metrics may be used. The duplex pairing information may also comprise a bidirectional transmission preference metric of the access node executing the process.

In the beginning, the access node operates, in block 401, in the half duplex mode. The steps related to blocks 402-405 correspond to the steps related to blocks 301-304 and will, therefore, not be repeated here. If none of the relevant neighboring access nodes are operating, in block 420, in the full duplex mode, the access node changes, in block 410, its duplex mode to full duplex and in response to the changing, causes sending, in block 411, information on the changed duplex mode to its relevant neighboring access nodes.

If the full duplex mode is in use in one or more relevant neighboring access nodes, the access node compares, in block 406, the bidirectional transmission preference metric of the access node to the bidirectional transmission preference metric of each of the one or more relevant neighboring access nodes operating in the full duplex mode. Consequently, if the bidirectional transmission preference metric of at least one of the one or more access nodes operating in the full duplex mode has, in block 430, a preferential value according to a pre-defined rule compared to the bidirectional transmission preference metric of the access node, the access node keeps operating, in block 401, in the half duplex mode as one or more of the relevant neighboring access nodes benefit more from using the full duplex mode in this case. In this embodiment of the invention, the pre-defined rule is defined to choose a single preferential (that is, "best") value out of two or more bidirectional transmission preference metrics. For example, the preferential value according to a pre-defined rule may correspond to the lowest or highest value depending on the definition of the bidirectional transmission preference metric. In some embodiments, the pre-defined rule may have a more complicated definition as will be discussed in detail below with FIG. 17. The pre-defined rule may be maintained in a memory of the access node.

If the bidirectional transmission preference metric of the access node has, in block 430, a preferential value according to the pre-defined rule compared to the other bidirectional transmission preference metrics, the access node causes sending, in block 407, a request for changing the duplex mode from full duplex to half duplex to the relevant neighboring access nodes of the access node operating in the full duplex mode. In other words, the access node determines that the highest benefit for the operation of the network is achieved if the access node uses the full duplex mode instead of any of the one or more relevant neighboring access node currently operating in the full duplex mode. Upon receiving, in block 408, a message confirming the duplex mode change from the at least one of the one or more relevant neighboring access nodes, the access node updates, in block 409, the corresponding duplex information in the duplex pairing information and changes, in block 410, its duplex mode to full duplex. As described above, in response to changing the duplex mode, the access node causes sending, in block 411, information on the changed duplex mode to its relevant neighboring access nodes.

Figure 5:
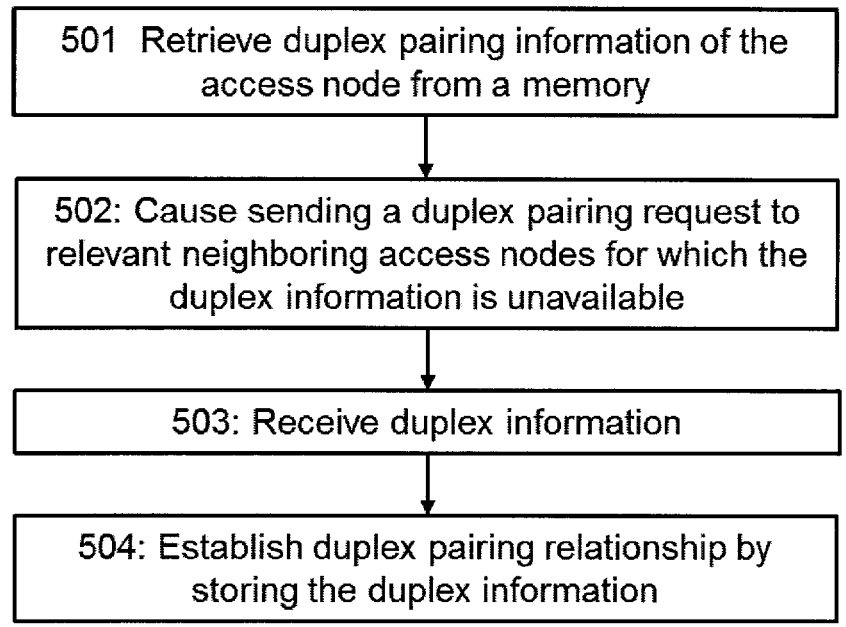

As described in relation to FIGS. 3 and 4, before the access node may determine whether it should switch to full duplex mode, the access node needs to determine its duplex pairing information. The duplex pairing information of the access node comprises duplex information of the relevant neighboring access nodes while the duplex information of each access node comprises at least information on the duplex mode of each access node and may also comprise a bidirectional transmission preference metric of each access node. The bidirectional transmission preference metric of the access node itself may also be needed for the determining. For the embodiment of FIG. 4 and any other embodiments based on the distributed scheme in which the access node itself makes the decisions on switching duplex modes, the bidirectional transmission preference metric of the access node may be maintained in a memory of the access node. FIG. 5 illustrates in detail the process of determining the duplex pairing information.

Referring to FIG. 5, the access node retrieves, in block 501, duplex pairing information of the access node from a memory. The duplex information of each relevant neighboring access node with which the access node has formed a duplex pairing relationship and of the access node itself is maintained in the memory and is therefore retrieved in this block. However, the access node may not have formed a duplex pairing relationship with all of its relevant neighboring access node. Therefore, the access node causes sending, in block 502, a duplex pairing request to one or more relevant neighboring access nodes for which the duplex information is unavailable. The access node receives, in block 503, the duplex information of the one or more relevant neighboring access nodes. Finally, the access node establishes, in block 504, a duplex pairing relationship with the one or more relevant neighboring access nodes wherefrom duplex information was received in block 503 by storing the duplex information.

Figure 6:
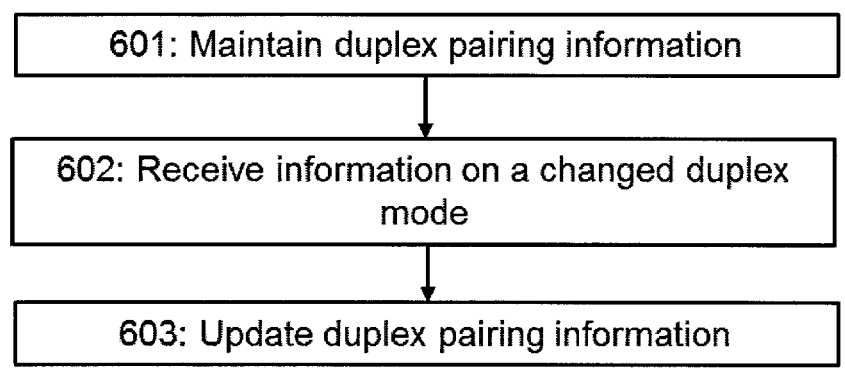
Figure 7:
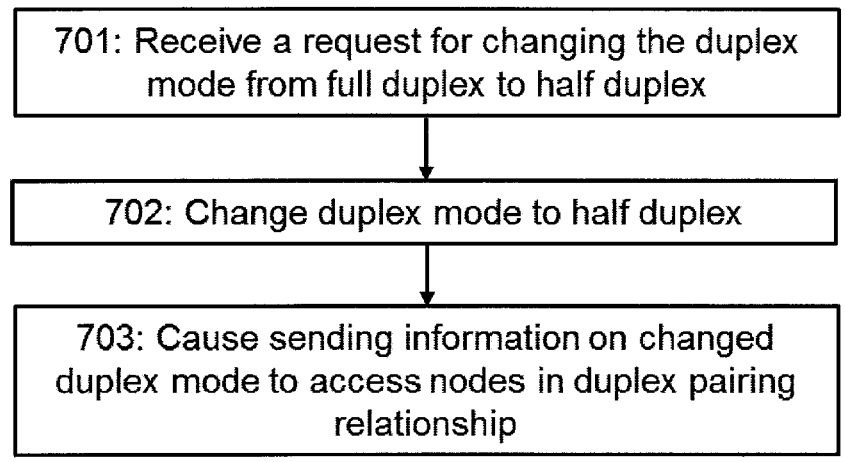
Figure 8:
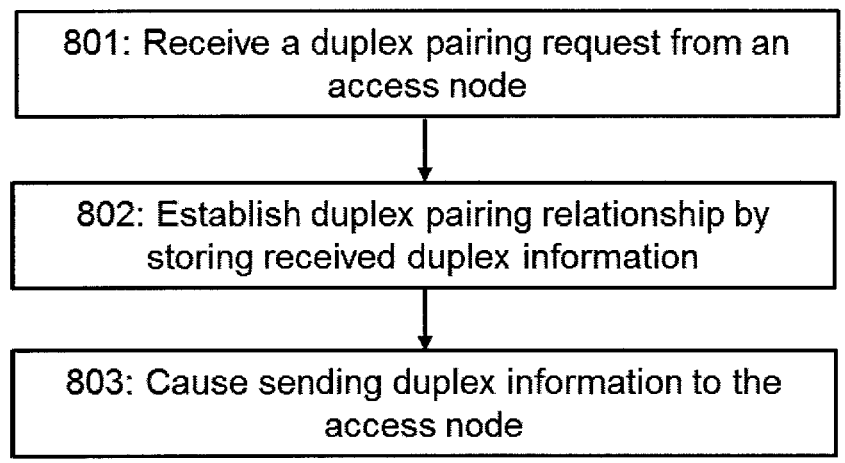

In addition to the processes described in relation to FIGS. 3-5 in which the access node acts as the main operating party, triggering the process, multiple additional processes for the access node may be needed in the case that one of the relevant neighboring access nodes of the access node initiates the process of FIGS. 3 to 5. FIGS. 6 to 8 illustrate the processes of the access nodes in such situations.

Referring to FIG. 6, the access node, maintains, in block 601, its duplex pairing information in a memory. In the distributed scheme, each relevant neighboring access node of the access node is configured to cause sending information on its changed duplex mode from full duplex to half duplex and vice versa, to its relevant neighboring access nodes. Therefore, at some point, the access node receives, in block 602, the information on a changed duplex mode from one of the relevant neighboring access nodes. As the duplex pairing information comprises information on the duplex modes of the relevant neighboring access nodes which are now no longer up-to-date, the access node updates, in block 603, the corresponding duplex information in the duplex pairing information.

After the access node has switched to full duplex mode, it may need to change back to the half duplex mode if one of its relevant neighboring access nodes needs to operate in full duplex mode and assigning the full duplex mode to the relevant neighboring access nodes yields a larger overall benefit for the network compared to the access node continuing operating in full duplex mode. The process executed by the access node in such a scenario is illustrate in FIG. 7. First, the access node receives, in block 701, a request for changing the duplex mode from full duplex to half duplex from one of its relevant neighboring access nodes. In response to the request, the access node changes, in block 702, the duplex mode from full duplex to half duplex. Finally, the access node causes sending, in block 703, information on the changed duplex mode to all the access node which are currently in duplex pairing relationship with the access node. Preferably, the duplex pairing access nodes include also the relevant neighboring access node from where the request was sent.

Relevant neighboring access nodes, too, may send duplex pairing requests if a duplex pairing relationship is not yet established. FIG. 8 illustrates the process of handling such a duplex pairing request from a relevant neighboring access node. First, the access node receives, in block 801, a duplex pairing request from a relevant neighboring access node. In response to the request, the access node establishes, in block 802, the duplex pairing relationship with the access node which sent the request by storing the duplex information comprised in the duplex pairing request. Finally, the access node causes sending, in block 803, its own duplex information to the access node which sent the request. It should be noted that the access node which sent the request also establishes the duplex pairing relationship with the access node to which the request was sent in a similar manner upon receiving the duplex information, as seen in block 504 of FIG. 5.

Figure 9:
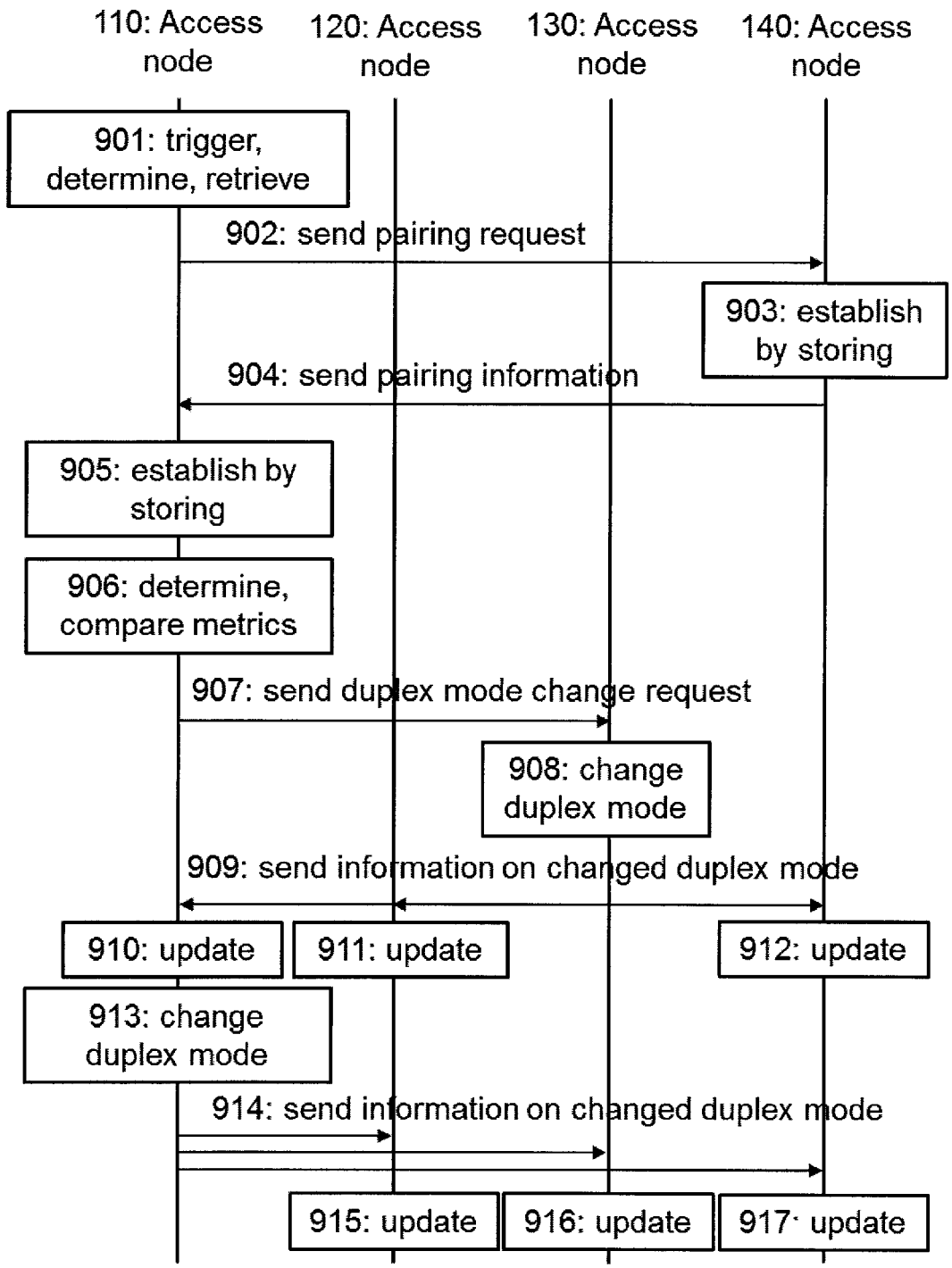
FIG. 9 illustrates a signaling diagram of configuring full duplex transmission for an access node.

FIG. 9 illustrates information exchange in the process of changing the duplex mode of an access node from half duplex to full duplex. The process may be applied to the distributed schemes. In the illustrated example, the access node 130 is the only access node which is initially in the full duplex mode, the other access nodes are in the half duplex mode.

The access node 110 triggers the process, determines its relevant neighboring access nodes, which are in the illustrated example access nodes 120, 130, 140, and retrieves the duplex pairing information of the access node in block 901. Upon retrieving the duplex pairing information, the access node 110 determines that the duplex information for the access node 140 is not available even though the access node 140 is a relevant neighboring access node of the access node 110 and sends, in message 902, a duplex pairing request to the access node 140. The access node 140 establishes, in block 903, a duplex pairing relationship by storing the duplex information of the access node 110 comprised in the duplex pairing request. The access node 140 sends, in message 904, its duplex information to the access node 110 which upon receiving the duplex information, establishes, in block 905, a duplex pairing relationship by storing the duplex information. The access node 110 determines, in block 906, the duplex modes of the relevant neighboring access nodes 120, 130, 140 and as the access node 130 is operating in the full duplex mode, the access node 110 compares, in block 906, the bidirectional transmission preference metrics of the access node 110 and the access node 130. The access node 110 determines that it has a more preferential value out of the two and sends, in message 907, a request for changing the duplex mode from full duplex to half duplex to the access node 130. Upon receiving the request, the access node 130 changes, in block 908, its duplex mode and sends, in messages 909, information on the changed duplex mode to its relevant neighboring access nodes, which in the illustrated example are access nodes 110, 120, 140, which upon receiving the information, update, in blocks 910, 911, 912, their duplex pairing information. Then, the access node 110 changes, in block 913, its duplex mode to full duplex. Finally, the access node 110 sends, in messages 914, the information on changed duplex mode to its relevant neighboring access nodes, i.e., access nodes 120, 130, 140, which upon reception, update, in blocks 915, 916, 917, their duplex pairing information.

Figure 10:
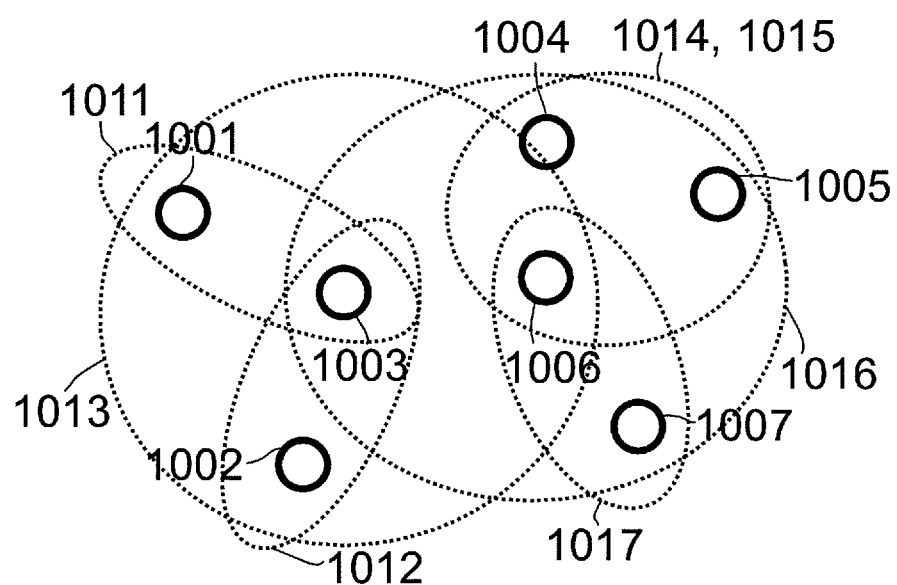
FIG. 10 illustrates a wireless communication scenario to which embodiments of the invention may be applied.

FIG. 10 illustrates another example of a communications system to which some embodiments of the invention may be applied. The communications system comprises seven access nodes 1001, 1002, 1003, 1004, 1005, 1006, 1007 each of which has from one to four relevant neighboring access nodes. The relevant neighboring access nodes for each access node 1001, 1002, 1003, 1004, 1005, 1006, 1007 are enclosed in FIG. 10 by dashed oval shapes 1011, 1012, 1013, 1014, 1015, 1016, 1017, respectively.

Figure 11:
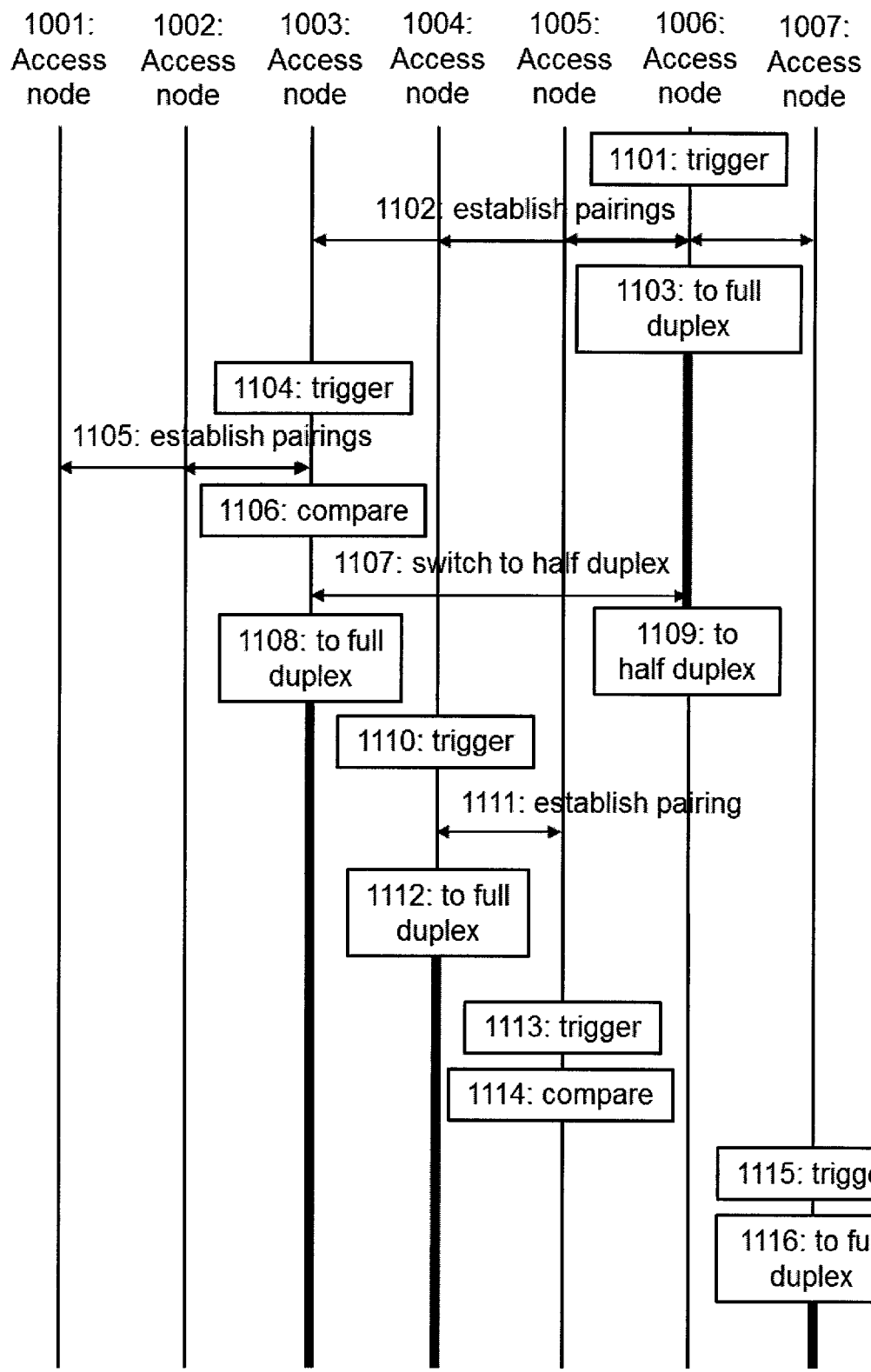
FIG. 11 illustrates a signaling diagram of configuring full duplex transmission for a multiple access nodes.

Relating to the communications system comprising access nodes 1001, 1002, 1003, 1004, 1005, 1006, 1007 in FIG. 10, a process of changing the duplex mode of multiple access nodes sequentially is illustrated in FIG. 11. It should be appreciated that only a simplified representation of the process is shown in FIG. 11. For example, the steps of determining the relative neighboring access nodes or updating the duplex pairing information of the relevant neighboring access nodes each time a duplex mode is changed or the detailed steps of establishing a duplex pairing relationship are not shown in FIG. 11. Furthermore, it is assumed in FIG. 11 that no duplex pairing relationships have been established and that all the access nodes 1001, 1002, 1003, 1004, 1005, 1006, 1007 operate in the half duplex mode initially. It is also assumed, for simplicity, that a lower reference numeral of the access node corresponds to more preferable bidirectional transmission preference metric of the access node. For example, the bidirectional transmission preference metric of the access node 1003 is "better" than the bidirectional transmission preference metrics of access nodes 1004, 1005, 1006, 1007 but worse than the bidirectional transmission preference metrics of access nodes 1001, 1002. Operation in the full duplex mode is illustrated in FIG. 11 with a thickened line.

Referring to FIG. 11, the access node 1006, first, triggers, in block 1101, the process of changing the duplex mode from half duplex to full duplex. As no duplex pairing relationships have been established yet, the access node 1006 establishes, in messages 1102, duplex pairing relationships with all of its relevant neighboring access nodes 1003, 1004, 1005, 1007. As none of the relevant neighboring access nodes 1003, 1004, 1005, 1007 are operating in full duplex mode, the access node 1006 can switch, in block 1103, directly to the full duplex mode.

Second, the access node 1003 triggers, in block 1104, the process of changing the duplex mode from half duplex to full duplex. The duplex pairing relationship has already been established between access nodes 1003, 1006 so the access node 1003 establishes, in messages 1105, duplex pairing relationships only with two of its relevant neighboring access nodes 1001, 1002. The access node 1003 compares, in block 1106, its bidirectional transmission preference metric to the bidirectional transmission preference metric of its only relevant neighboring access node 1006 operating in the full duplex mode. As the relevant neighboring access node 1006 has less preferable bidirectional transmission preference metric compared to the access node 1003, the access node 1003 requests the access node 1006 to switch to the half duplex mode, in messages 1107. Consequently, the access node 1006 switches, in block 1109, back to the half duplex mode and the access node 1003 switches, in block 1108, to the full duplex mode.

Third, the access node 1004 triggers, in block 1110, the process of changing the duplex mode from half duplex to full duplex. The access node 1004 only has to establish, in messages 1111, duplex pairing relationship with one relevant neighboring access node, access node 1005. As none of the relevant neighboring access nodes 1005, 1006 of the access node 1004 are operating in the full duplex mode, the access node 1004 may switch, in block 1112, to the full duplex mode directly.

Fourth, the access node 1005 triggers, in block 1113, the process of changing the duplex mode from half duplex to full duplex. The duplex pairing relationship has already been established between the access node 1005 and all of its relevant neighboring access nodes, i.e., access nodes 1004, 1006, previously. The relevant neighboring access node 1004 is operating in full duplex mode. The access node 1005 compares, in block 1114, its bidirectional transmission preference metric to the bidirectional transmission preference metric of the relevant neighboring access node 1004. As the access node 1005 has a less preferable value, it cannot switch to full duplex mode.

Fifth, the access node 1007 triggers, in block 1115, the process of changing the duplex mode from half duplex to full duplex. The duplex pairing relationship has already been established between the access node 1007 and its only relevant neighboring access node, the access node 1006, previously. As the relevant neighboring access node 1006 is not operating in the full duplex mode, the access node 1007 switches, in block 1116, to the full duplex mode. In the end of the sequence, three access nodes (access nodes 1003, 1004, 1007) of the seven access nodes 1001, 1002, 1003, 1004, 1005, 1006, 1007 are operating in the full duplex mode.

Figure 12:
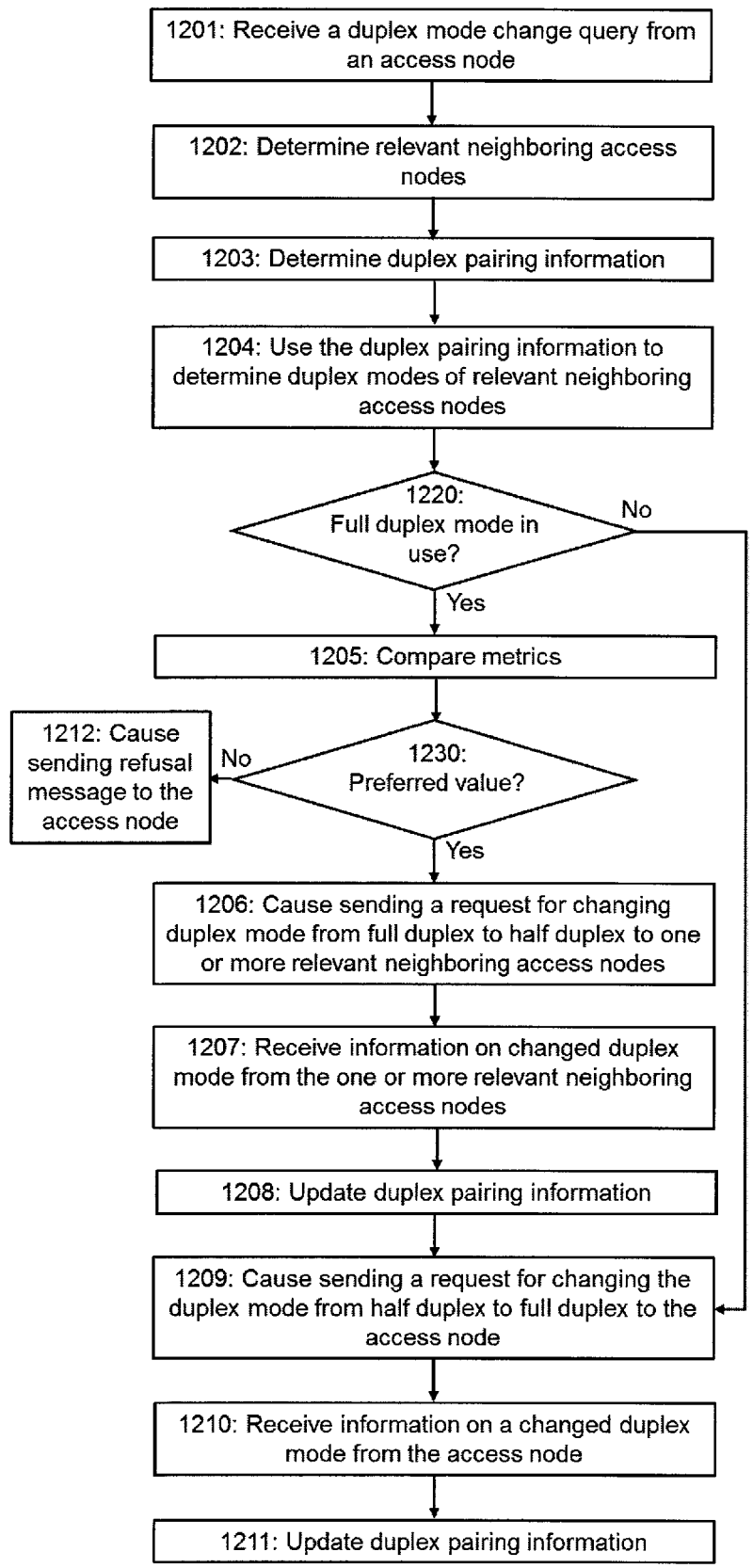
FIGS. 12-15 illustrate flow diagrams of configuring full duplex transmission for an access node from the point of view of the access node.

An embodiment of the process executed by the control access node in a communications system having a centralized scheme for enabling full duplex transmission for one of the access nodes controlled by the control access node is illustrated in FIG. 12. Similar assumptions apply as in FIG. 4. Hence, the relevant neighboring access nodes may already be operating in the full duplex mode. Furthermore, the duplex information of each access node also comprises a bidirectional transmission preference metric defined as described above. The duplex pairing information also comprises a bidirectional transmission preference metric of the access node which is requesting the full duplex mode operation. Obviously, since the control access node controls the duplex modes of all the other access nodes, the duplex pairing information of each access node is maintained, in this case, in a memory of the control access node, instead of maintaining the information in individual memories of the access nodes.

The process in the control access node is initiated when the control access node receives, in block 1201, a duplex mode change query from an access node for changing the duplex mode of the access node from half duplex to full duplex. The duplex mode change query comprises at least a bidirectional transmission preference metric of the access node. It should be appreciated that this first step corresponds to the step 301 of FIG. 3. The steps related to blocks 1202-1204 correspond to the steps related to blocks 302-304 of FIG. 3 and will, therefore, not be repeated here. However, it should be appreciated that determining the relevant neighboring access nodes may in this case comprise determining the relevant neighboring access nodes based on link performance data provided by the access nodes and maintained in the control access node. In some embodiments, the access nodes may calculate the relevant neighbors themselves and provide the pre-calculated data to the control access node to be used in the determining. At least part of the link performance and/or relevant neighbor data provided by the access node may be comprised in the duplex mode change query.

If none of the relevant neighboring access nodes are operating in the full duplex mode (block 1220), the control access node causes sending, in block 1209, a request for changing the duplex mode from half duplex to full duplex to the access node. Upon receiving, in block 1210, information on the changed duplex mode from the access node, the control access node updates, in block 1211, the corresponding duplex information in the duplex pairing information of the control access node.

If the full duplex mode is in use in one or more relevant neighboring access nodes (block 1220), the control access node compares, in block 1205, corresponding to block 406 in FIG. 4, the bidirectional transmission preference metric of the access node to the bidirectional transmission preference metric of each of the one or more relevant neighboring access nodes operating in the full duplex mode. If the bidirectional transmission preference metric of at least one of the one or more access nodes operating in the full duplex mode has, in block 1230, a preferential value according to a pre-defined rule compared to the bidirectional transmission preference metric value of the access node, the control access node causes sending, in block 1212, a refusal message to the access node indicating that the access node may not switch its duplex mode to full duplex. The pre-defined rule may be maintained in a memory of the control access node.

If the bidirectional transmission preference metric of the access node has, in block 1230, a preferential value according to the pre-defined rule compared to the other bidirectional transmission preference metrics, the control access node causes sending, in block 1206, a request for changing the duplex mode from full duplex to half duplex to the one or more relevant neighboring access nodes of the access node operating in the full duplex mode. Upon receiving, in block 1207, information on a changed duplex mode from the at least one of the one or more relevant neighboring access nodes, the control access node updates, in block 1208, the corresponding duplex information in the duplex pairing information. The control access node causes sending, in block 1209, a request for changing its duplex mode to full duplex to the access mode. As described above, upon receiving, in block 1210, information on a changed duplex mode from the access node the duplex mode, the control node updates, in block 1211, the corresponding duplex information in the duplex pairing information of the control access node.

Figure 13:
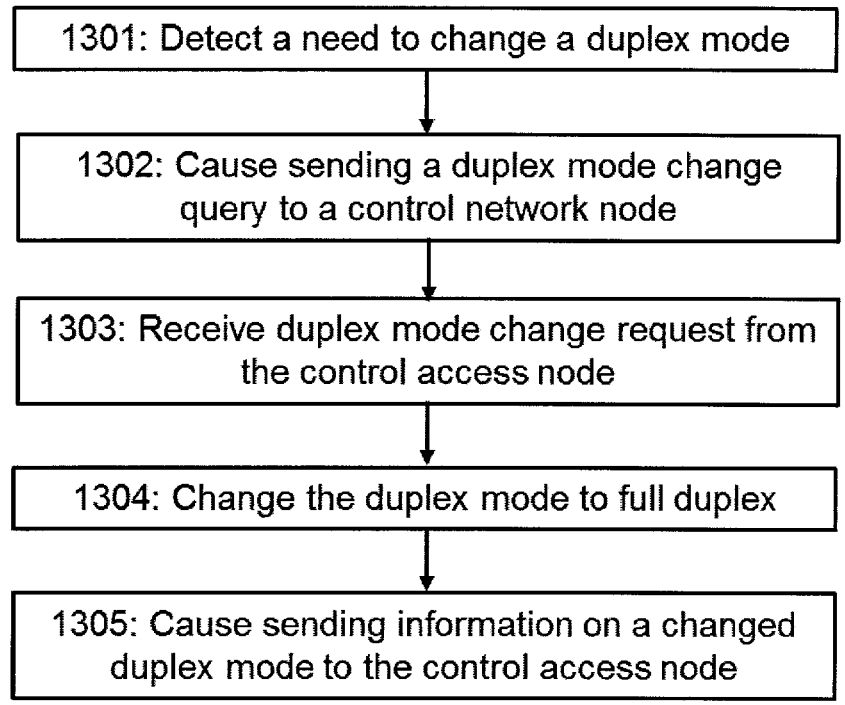
Figure 14:
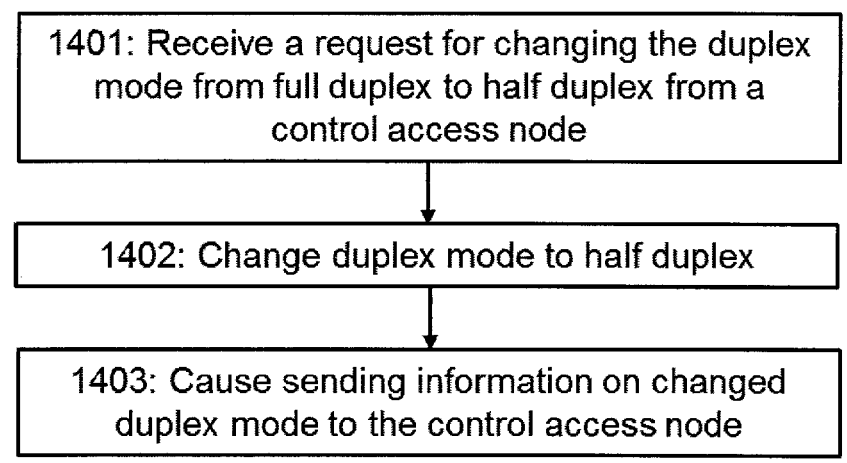
Figure 15:
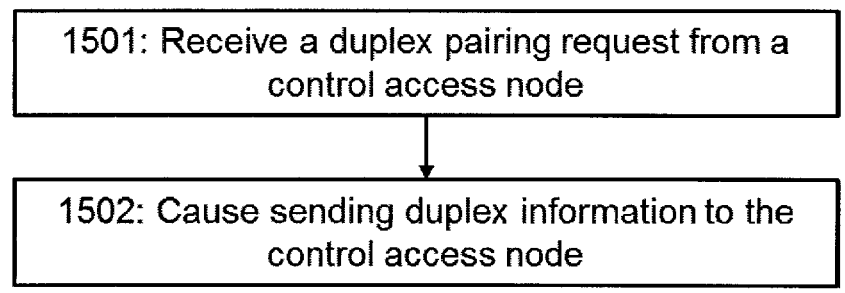

While in the centralized scheme most of the operations are performed by the control access node, the access node which triggers the process for changing the duplex mode to full duplex does retain some operations that are illustrated in FIGS. 13-15.

The process executed by the access node for enabling the full duplex transmission for the access node is illustrated in FIG. 13. The access node detects, in block 1301, a need to change its duplex mode, similar to the distributed embodiments. However, instead of doing the duplex mode changing procedure itself, the access node causes sending, in block 1302, a duplex mode change query to the control access node. After the control access node carries out the process illustrated in FIG. 12 successfully, that is, the control access node judges the switching to the full duplex mode to be justified from a network perspective, the access node receives, in block 1303, a duplex mode change request from the control access node. Upon receiving the request, the access node changes, in block 1304, its duplex mode from half duplex to full duplex and causes sending, in block 1305, information on the changed duplex mode to the control access node.

It should be obvious that if the access node receives a refusal message, as sent in block 1212 of FIG. 12, the access node keeps operating in the half duplex mode.

After the access node which was allowed the full duplex mode operation by the control access node has operated for a period in the full duplex mode, another access node which is a relevant neighbor of the access node may need to use the duplex mode. If the control access node judges that reverting the access node back to the half duplex mode operation would be best for overall network operations, the access node executes the process illustrated in FIG. 14. Upon receiving, in block 1401, a request for changing the duplex mode from full duplex back to half duplex, the access node changes, in block 1402, its duplex mode and causes sending, in block 1403, information on the changed duplex mode to the control access node. Comparing to FIG. 7 which illustrates a similar process for the distributed scheme, the only difference between the two processes is the final step. In the centralized scheme, there is no need for the access node to inform all its relevant neighboring access nodes of the changed duplex mode as the duplex information is maintained only in the control access node.

Forming duplex pairing relationships works in much the same way in the centralized scheme as it does in the distributed scheme. Instead of each access node collecting and maintaining information regarding its duplex pairing relationships, the information is collected and maintained in the control access node. From the point of view of the control access node, the process progresses as illustrated in FIG. 5, that is, the operation is similar to the operation of an access node in the distributed system performing the same task. However, while in the distributed scheme the duplex pairing request contained duplex information of the access node requesting the pairing, the duplex pairing request sent by the control access node may not comprise duplex information or any other additional information as such information need not be stored to the access nodes in the centralized scheme. The process is illustrated from the point of view of the access node receiving the request in FIG. 15. The access node receives, in block 1501, a duplex pairing request from the control access node and in response to the receiving, causes sending, in block 1502, duplex information of the access node to the control access node. Comparing to FIG. 8 which illustrates a similar process for the distributed scheme, the only difference between the two processes is that in the centralized scheme the access node does not establish a duplex pairing relationship by storing the received duplex information. In the centralized scheme, there is no need for the access nodes other than the control access node to keep track of the duplex pairing information. Only the information directly related to the operation of the access node itself (e.g., the duplex mode, the bidirectional transmission preference metric) may be maintained in the non-controlling access nodes.

Figure 16:
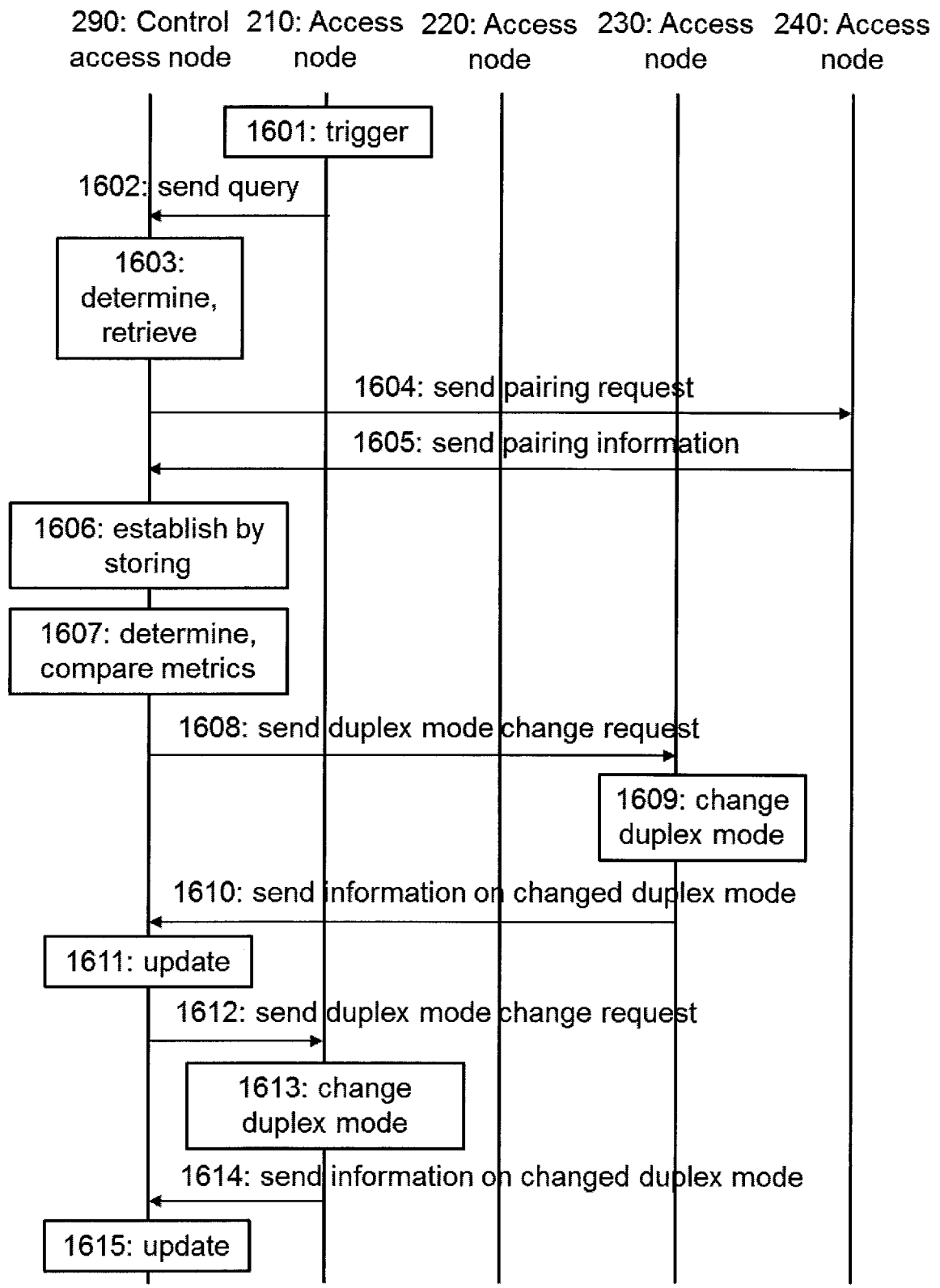
FIG. 16 illustrates a signaling diagram of configuring full duplex transmission for a an access node.

FIG. 16 illustrates the process of changing the duplex mode of an access node from half duplex to full duplex applied to the communications system according to the centralized scheme. In this example, the access node 230 is the only access node which is initially in the full duplex mode. The process is comparable to the one illustrated in FIG. 9 for the distributed scheme.

The access node 210 triggers, in block 1601, the process. In response to the triggering, the access node 210 sends a duplex mode change query to the control access node 290. The control access node 290 determines the relevant neighboring access nodes of the access node 210 and retrieves the duplex pairing information from a memory of the control access node 290, in block 1603. Upon retrieving the duplex pairing information, the control access node determines that the duplex information for the access node 240 is not available even though the access node 240 is a relevant neighboring access node of the access node 210 and sends, in message 1604, a duplex pairing request to the access node 240. Upon receiving the duplex pairing request, the access node 240 sends, in message 1605, its duplex information to the control access node 290 which upon receiving the duplex information, establishes, in block 1606, a duplex pairing relationship by storing the duplex information. The control access node 290 determines, in block 1607, the duplex modes of the relevant neighboring access nodes 220, 230, 240 and as the neighboring access node 230 is operating in the full duplex mode, the control access node 290 compares, in block 1607, the bidirectional transmission preference metrics of the access node 210 and the access node 230. The control access node 290 determines that the access node 210 has a more preferential value out of the two and sends, in message 1608, a request for changing the duplex mode from full duplex to half duplex to the access node 230. Upon receiving the request, the access node 230 changes, in block 1609, its duplex mode and sends, in message 1610, information on the changed duplex mode to the control access node 290 which upon receiving the information, updates, in block 1611, its duplex pairing information relating to the access node 230. Then, the control access node 290 sends, in message 1612, a duplex mode change request to the access node 210. The access node 210 receives the request and changes, in block 1613, its duplex mode from half duplex to full duplex. Finally, the access node 210 sends, in message 1614, the information on the changed duplex mode to the control access node 290 which upon reception, updates, in block 1615, its duplex pairing information relating to the access node 210.

As briefly mentioned above, in some embodiments relating to either the distributed or centralized schemes, the pre-defined rule for determining full duplex mode operation for access nodes based on bidirectional transmission preference metrics may be defined such that two or more relevant neighboring access nodes may operate in the full duplex mode simultaneously. In other words, the pre-defined rule does not look only for a single preferred bidirectional transmission preference metric value corresponding to a single access node but may allow for one or more relevant neighboring access nodes to operate in the full duplex mode depending on the bidirectional transmission preference metric values of the access nodes. Such multiple full duplex operation may be pertinent, for example, if the bidirectional transmission preference metrics indicate that the need for the additional capacity is very high for multiple relevant neighboring access nodes and/or that the ICI induced due to the use of the full duplex mode in multiple access nodes is not very detrimental to the performance. In a simple example, the pre-defined rule may pick two most preferential bidirectional transmission preference metric values, instead of just one, and allow both of the corresponding access nodes to use full duplex mode. In another example, a threshold value for the bidirectional transmission preference metric may be set and all access nodes which want to use the full duplex mode and which have bidirectional transmission preference metric values that are above or below (depending on the definition of the bidirectional transmission preference metric) that threshold value are allowed to operate in full duplex mode. In some embodiments, a second pre-defined rule may be defined. For example, the two aforementioned examples may be combined so that, using the first rule, one or more preferential bidirectional transmission preference metric values are chosen and, using the second rule, it is checked whether they are above or below a pre-defined threshold value. The first pre-defined rule may relate to using the full duplex mode in multiple access nodes and the second pre-defined rule may relate only to using the full duplex mode in a single access node. To give an example, the first pre-defined rule may compare the bidirectional transmission preference metric values to a predefined threshold value for allowing full duplex mode operation for multiple access nodes. If none of the bidirectional transmission preference metric values satisfy the threshold set by the first pre-defined rule, the second pre-defined rule may be simply defined to find the most preferential bidirectional transmission preference metric value for allowing full duplex mode operation for a single access node.

Figure 17:
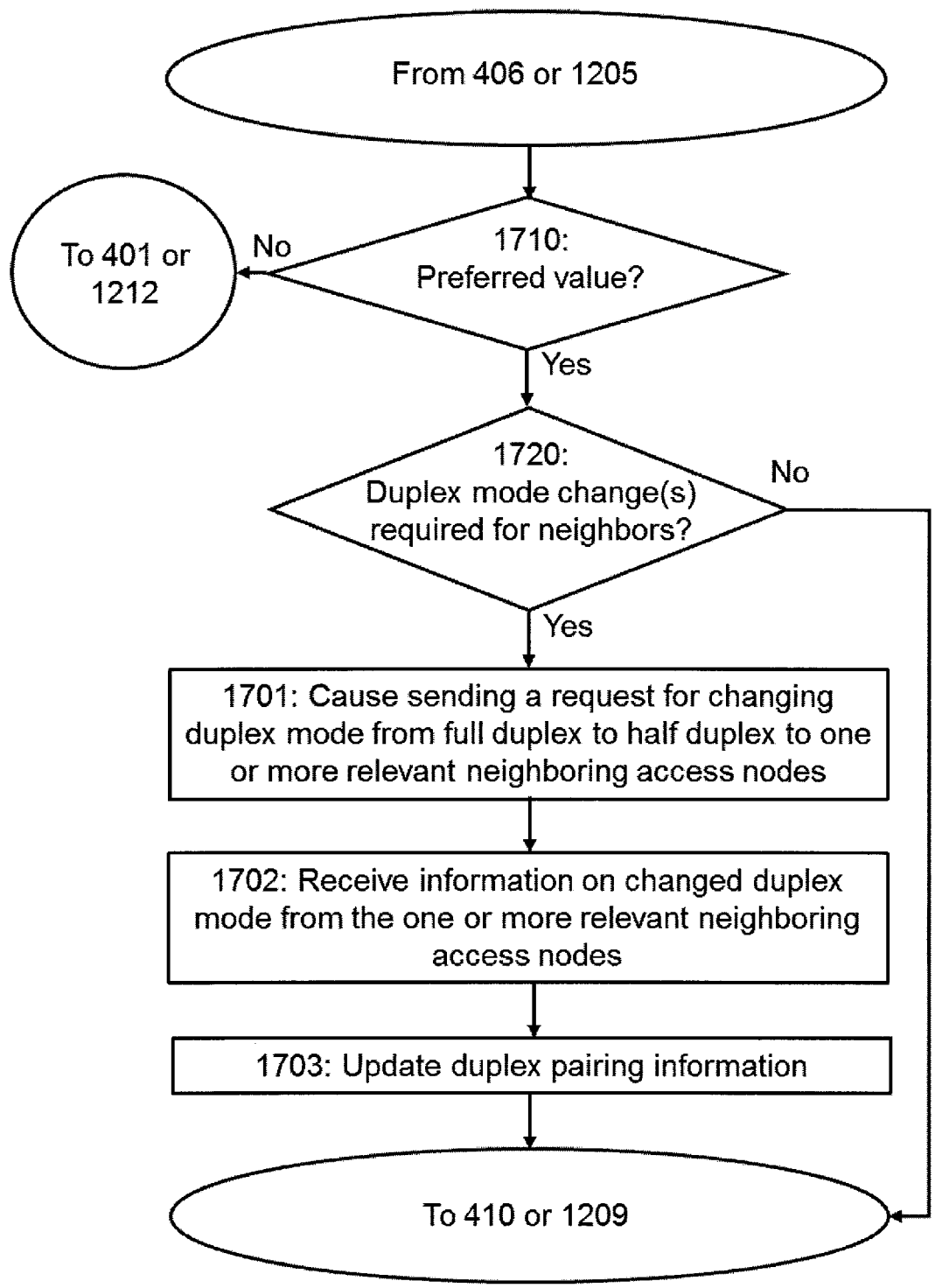
FIG. 17 illustrates a flow diagram of configuring full duplex transmission for an access node.

If multiple relevant neighboring access nodes are allowed to operate in the full duplex mode simultaneously, some of the steps in FIGS. 4 and 12 may be skipped in certain circumstances. This process is illustrated in FIG. 17. The process of FIG. 17 may be carried out by the access node of any distributed scheme or the control access node of the centralized scheme. If, after the bidirectional transmission preference metrics are compared, in block 406 of FIG. 4 or block 1205 of FIG. 12, the bidirectional transmission preference metric of the access node does not have, in block 1710, a preferential value according to the pre-defined rule compared to the other bidirectional transmission preference metrics, the process proceeds according to block 401 of FIG. 4 or block 1212 of FIG. 12. If the bidirectional transmission preference metric of the access node has, in block 1710, a preferential value according to a pre-defined rule compared to the other bidirectional transmission preference metrics, the access node or the control access node checks whether all the relevant neighboring access nodes operating in the full duplex mode also have preferential values according to the pre-defined rule. If this is true, there is no need for changing the duplex mode of any of the relevant neighboring access nodes and the access node changes its duplex mode directly according to block 410 of FIG. 4 or the control access node causes changing the duplex mode of the access node according to block 1209 of FIG. 12. If at least one of the relevant neighboring access nodes operating in the full duplex mode does not have a preferential value according to the predefined rule, the access node or the control access node causes changing, in blocks 1701 to 1703, the duplex mode(s) of at least one of the relevant neighboring access nodes having the non-preferential value from full duplex to half duplex. The process is similar to blocks 407 to 409 of FIG. 4 or blocks 1206 to 1208 of FIG. 12 and will not be repeated here for brevity. After the duplex modes of the at least one of the relevant neighboring access nodes have been changed, the access node changes its duplex mode directly according to block 410 of FIG. 4 or the control access node causes changing the duplex mode of the access node according to block 1209 of FIG. 12.

In some embodiments of the invention, one or more pre-defined rules may be defined for comparing two or more bidirectional transmission preference metrics for each access node. To give an example of an embodiment where two bidirectional transmission preference metrics for each access node are used, a neighboring density metric and a metric for uplink/downlink traffic symmetry may be defined as two bidirectional transmission preference metrics and the decision whether one or more relevant neighboring access nodes may operate in the full duplex mode simultaneously depends on both metrics according to one or more pre-defined rules. For example, the one or more pre-defined rules may specify that both of the metrics must have the most preferential (e.g., the highest) value for an access node to be switched to the full duplex mode. Alternatively, the two metrics may be combined into one metric, for example, by multiplying the neighboring density metric by the uplink/downlink symmetry metric, as described above in relation to FIG. 4. It should be understood that if multiple bidirectional transmission preference metrics are used in allocating the duplex modes, all the relevant bidirectional transmission preference metrics should be sent to the deciding entity (access node/control access node) in the processes described in FIGS. 3 to 17, instead of just a single bidirectional transmission preference metric.

The blocks, related functions, and information exchanges described above by means of FIGS. 3 to 17 are in no absolute chronological order, and some of them may be performed simultaneously or in an order differing from the given one. For example, the distributed and centralized schemes may be operating simultaneously in the same environment. In some embodiments, some of the steps may be neglected, for example, if the relevant information is already available (e.g., stored to a memory). For example, the relevant neighboring access nodes may not be determined every time a process is executed according to FIG. 3, 4 or 12 if recent information on the neighboring access node is already stored to a memory.

Figure 18:
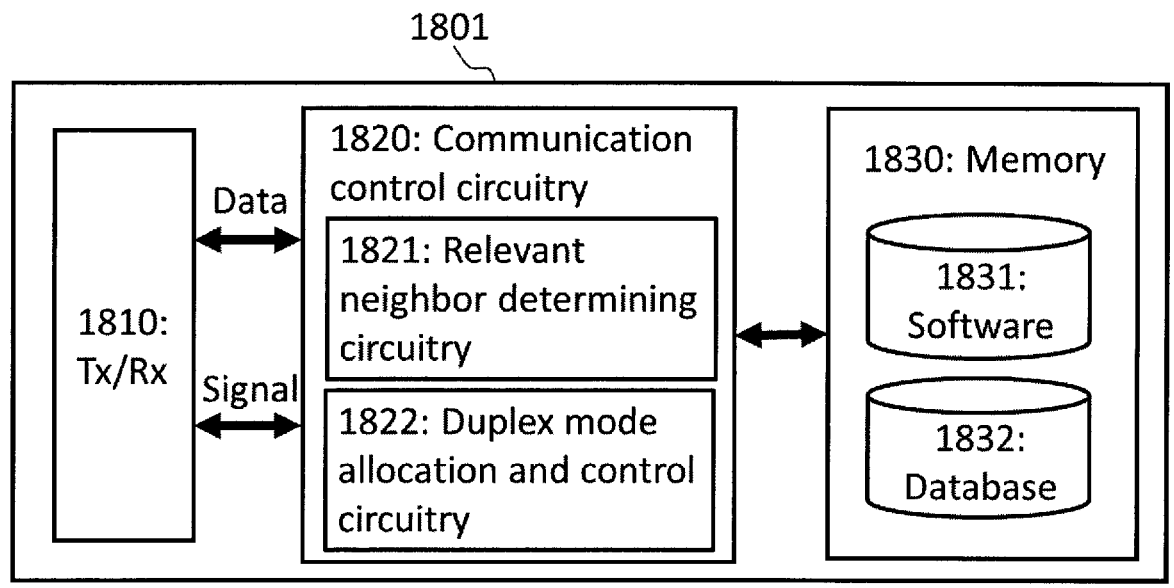
FIGS. 18-20 illustrate block diagrams of apparatuses according to some embodiments of the invention.

FIG. 18 illustrates an apparatus 1801 configured to carry out the functions described above in connection with an access node in the distributed scheme, such as access nodes 110, 120, 130, 140, 150 indicated in FIG. 1. The apparatus may be an electronic device comprising electronic circuitries. The apparatus may be any access node 110, 120, 130, 140, 150 or it may be comprised in or be applicable to the access node 110, 120, 130, 140, 150. The apparatus may be a separate network entity or a plurality of separate entities. The apparatus may comprise a communication control circuitry 1820, such as at least one processor, and at least one memory 1830 including a computer program code (software) 1831 wherein the at least one memory and the computer program code (software) are configured, with the at least one processor, to cause the apparatus to carry out any one of the embodiments of the access node in the distributed schemes described above.

The memory 1830 may comprise a database 1832 which may comprise duplex information and duplex pairing information, that is, duplex information of the relevant neighboring access nodes, as described in previous embodiments. The database 1832 may further comprise a set of rules for relevant neighbor determination and link performance information to be used for relevant neighbor determination and information on the relevant neighboring access nodes of the apparatus. The database 1832 may also comprise one or more predefined rules for evaluating and comparing bidirectional transmission preference metrics. The memory 1830 may also comprise other databases which may not be related to the duplex mode or relevant neighbor determination functionalities.

Referring to FIG. 18, the communication control circuitry 1820 may comprise relevant neighbor determining circuitry 1821 and duplex mode allocation and control circuitry 1822 configured to determine duplex modes for access nodes and to change the duplex mode of the access node. The duplex mode allocation and control circuitry 1822 may be configured to carry out all blocks in FIG. 3 except 302, all blocks in FIG. 4 except 403 and/or all blocks in FIGS. 5 to 8. The relevant neighbor determining circuitry 1821 is configured to determine the relevant neighboring access node based on the measured link performance information using the set of rules maintained in the database 1832. The relevant neighbor determining circuitry 1821 may be configured to carry out block 302 and/or 403 described above.

Figure 19:
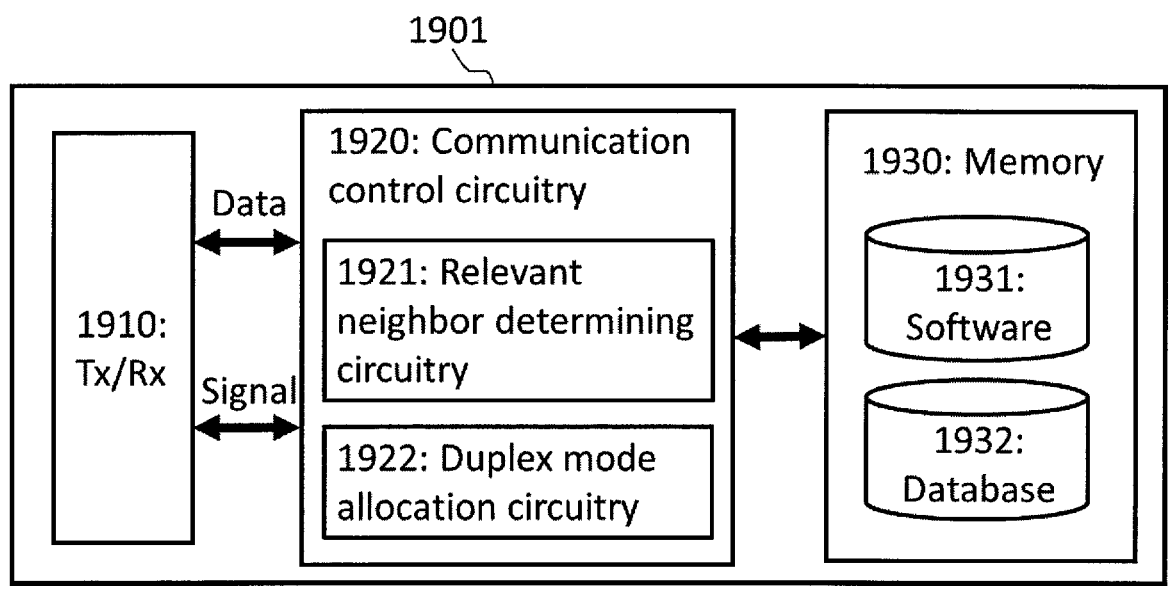

FIG. 19 illustrates an apparatus 1901 configured to carry out the functions described above in connection with a control access node in the centralized scheme, such as the control access node 290 indicated in FIG. 2. The apparatus may be an electronic device comprising electronic circuitries. The apparatus may be a separate network entity or a plurality of separate entities. The apparatus may comprise a communication control circuitry 1920 such as at least one processor, and at least one memory 1930 including a computer program code (software) 1931 wherein the at least one memory and the computer program code (software) are configured, with the at least one processor, to cause the apparatus to carry out any one of the embodiments of the control access node in the centralized schemes described above.

The memory 1930 may comprise a database 1932 which may comprise duplex information and duplex pairing information relating to a plurality of access nodes as described in previous embodiments. The database 1932 may further comprise a set of rules for relevant neighbor determination and link performance information to be used for relevant neighbor determination and/or information on the relevant neighboring access nodes of a plurality of access nodes. The database 1932 may also comprise one or more pre-defined rules for evaluating and comparing bidirectional transmission preference metrics. The memory 1930 may also comprise other databases which may not be related to the duplex mode or relevant neighbor determination functionalities.

Referring to FIG. 19, the communication control circuitry 1920 may comprise duplex mode allocation circuitry 1922 configured to determine duplex modes for access nodes. The duplex mode allocation circuitry 1921 may be configured to carry out all blocks in FIG. 5 and/or all blocks in FIG. 12 except 1202. The relevant neighbor determining circuitry 1921 is configured to determine the relevant neighboring access node based on the measured link performance information provided by the access nodes using the set of rules maintained in the database 1932. The relevant neighbor determining circuitry 1921 may be configured to carry out block 302 and/or block 1202 described above.

Figure 20:
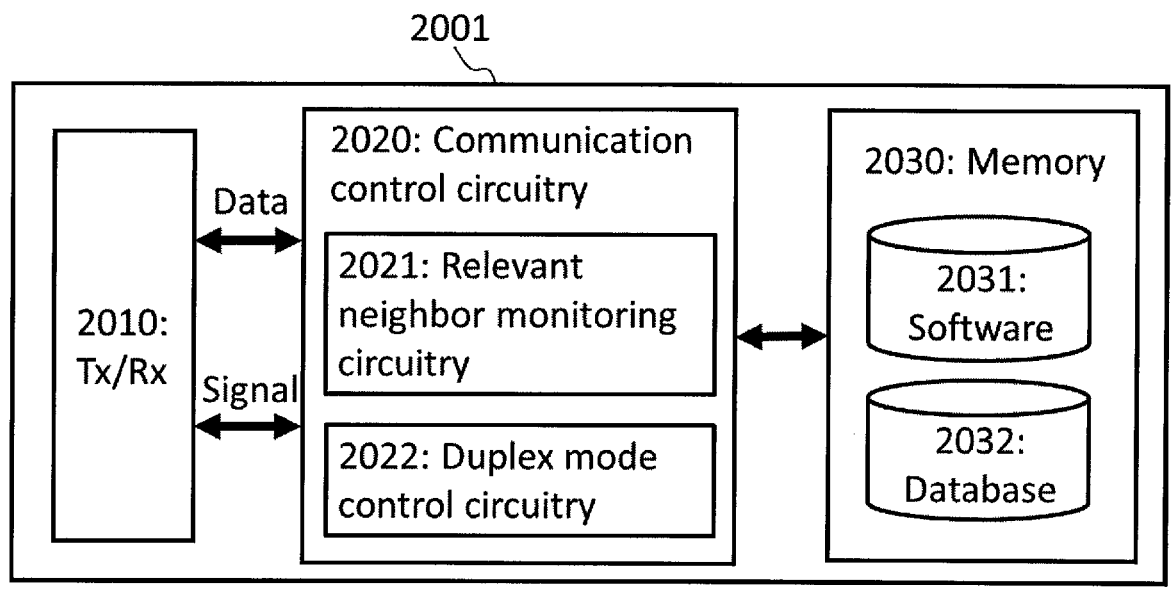

FIG. 20 illustrates an apparatus 2001 configured to carry out the functions described above in connection with an access node in the centralized scheme, such as access nodes 210, 220, 230, 240 indicated in FIG. 2. The apparatus may be an electronic device comprising electronic circuitries. The apparatus may be a separate network entity or a plurality of separate entities. The apparatus may comprise a communication control circuitry 2020 such as at least one processor, and at least one memory 2030 including a computer program code (software) 2031 wherein the at least one memory and the computer program code (software) are configured, with the at least one processor, to cause the apparatus to carry out any one of the embodiments of the control access node in the centralized schemes described above.

The memory 2030 may comprise a database 2032 which may comprise duplex information. The database 2032 may further comprise link performance information to be used for relevant neighbor determination. In some embodiments, the database 2032 may comprise a set of rules for relevant neighbor determination. The memory 2030 may also comprise other databases which may not be related to duplex mode or relevant neighbor determination functionalities.

Referring to FIG. 20, the communication control circuitry 2020 may comprise relevant neighbor monitoring circuitry 2021 and duplex mode control circuitry 2022. The relevant neighbor monitoring circuitry 2021 is configured to acquire link performance information via measurements. The relevant neighbor monitoring circuitry 2021 may be configured to send the link performance information to the control access node for determining relevant neighboring access nodes. In some embodiments, the communication control circuitry may also comprise relevant neighbor determining circuitry (not shown in FIG. 20) which may be used to determine the relevant neighboring access nodes of the access node, instead of relegating the task to the control access node. The duplex mode control circuitry 2022 is configured to trigger the duplex mode changing process, change the duplex mode when requested by the control access node and send the duplex information to the control access node. The duplex mode control circuitry 2022 may be configured to carry out all the blocks in FIGS. 13, 14 and 15 described above.

The apparatuses 1801, 1901, 2001 described in relation to FIGS. 18 to 20 may further comprise communication interfaces (Tx/Rx) 1810, 1910, 2010 comprising hardware and/or software for realizing communication connectivity according to one or more communication protocols. The communication interface may provide the apparatus with communication capabilities to communicate in the cellular communication system and enable communication with other access nodes and terminal devices, for example. The communication interface 1810, 1910, 2010 may comprise standard well-known components such as an amplifier, filter, frequency-converter, (de)modulator, and encoder/decoder circuitries and one or more antennas. The communication interface 1810, 1910, 2010 may comprise radio interface components providing the apparatus with radio communication capability in the cell.

The memories of the apparatuses described in relation to FIGS. 18 to 20 may be implemented using any suitable data storage technology, such as semiconductor based memory devices, flash memory, magnetic memory devices and systems, optical memory devices and systems, fixed memory and removable memory.

In some embodiments, the functionalities assigned solely for the triggering access node in the distributed scheme may be divided differently between the control access node and the access node under control of the control access node compared to the presented centralized schemes. Moreover, the duplex information may be maintained in both the control access node and the controlled access nodes in some embodiments. Such an approach may be pertinent, for example, if both the distributed and centralized schemes are supported simultaneously.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 17 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 16 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 17 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a per-son of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method comprising:
    detecting a need to change a duplex mode in a first network node from a half duplex mode to a full duplex mode;
    determining one or more relevant neighboring network nodes of the first network node including sending a duplex pairing request to a neighboring access node should duplex pairing information associated with the neighboring access is unavailable in a memory of the first network node;
    determining duplex paring information of the first network node, wherein the duplex pairing information of the first network node comprises;

duplex information of the one or more relevant neighboring network nodes, the duplex information comprising at least information on a current duplex mode of a corresponding neighboring network node, and bidirectional transmission preference metric of the first network node and the duplex information of the one or more relevant neighboring network nodes further comprises bidirectional transmission preference metrics of the one or more neighboring network nodes, wherein the bidirectional transmission preference metric is at least one of a neighboring density metric and a metric for uplink/downlink traffic symmetry;

using the duplex pairing information of the first network node to determine duplex modes of the one or more relevant neighboring network nodes;

if all of the one or more relevant neighboring network nodes of the first network node operate in the half duplex mode, causing changing the duplex mode of the first network node to the full duplex mode; and in response to the causing changing the duplex mode, causing updating information on a current duplex mode of the first network node.

2. A method according to claim 1, wherein if at least one of the one or more relevant neighboring network nodes of the first network node operates in the full duplex mode, the method further comprises:

comparing the bidirectional transmission preference metric of the first network node and the bidirectional transmission preference metric of each of the one or more relevant neighboring network nodes operating in the full duplex mode, wherein the bidirectional transmission preference metric is at least one of a neighboring density metric and a metric for uplink/downlink traffic symmetry;

using a pre-defined rule to determine, based on the comparing, which ones of the network nodes are allowed to operate in the full duplex mode; and if according to the pre-defined rule at least one of the at least one of the one or more relevant neighboring network nodes of the first network node operating in the full duplex mode is determined not to be allowed to be in the full duplex mode when the first network node is allowed to be in the full duplex mode, causing sending a request for changing the duplex mode from the full duplex mode to the half duplex mode to each of the relevant neighboring network nodes operation in the full duplex mode that are determined not to be allowed to be in the full duplex mode, and upon receiving a message confirming the change of the duplex mode to the half duplex mode from each of the at least one of the at least one of the one or more relevant neighboring network nodes determined not to be allowed to be in the full duplex mode, updating the corresponding duplex information in the duplex pairing information, and if according to the pre-defined rule the first network node is allowed to be in the full duplex mode, causing changing the duplex mode of the first network node to the full duplex mode.

3. A method according to claim 1, wherein the determining the duplex pairing information of the first network node comprises:

retrieving the duplex pairing information of the first network node from a memory.

4. A method according to claim 3, wherein the determining the duplex pairing information of the first network node further comprises:

if, after retrieving the duplex pairing information of the first network node, the duplex information for at least one of the one or more relevant neighboring network nodes is unavailable, causing sending a duplex pairing request to the at least one of the one or more relevant neighboring network nodes of the first network node; and upon receiving duplex pairing response comprising duplex information from the at least one of the one or more relevant neighboring network nodes, establishing duplex pairing relationships between the first network node and the at least one of the one or more relevant neighboring network nodes by storing the duplex information of the at least one of the one or more relevant neighboring network nodes to the memory.

5. A method according to claim 1, wherein the method is performed in the first network node, the causing updating the information on the current duplex mode of the first network node comprises:

causing sending information on the changed duplex mode to the one or more relevant neighboring network nodes of the first network node; and the duplex pairing request comprises a bidirectional transmission preference metric of the first network node and information on a current duplex mode of the first network node.

6. A method according to claim 5, further comprising:

upon receiving from a relevant neighboring network node information on a changed duplex mode, updating, by the first network node, duplex information on the corresponding relevant neighboring network node in the duplex pairing information of the first network node.

7. A method according to claim 5, comprising:

receiving, in the first network node, a request for changing the duplex mode from the full duplex mode to the half duplex mode;

changing, in the first network node, the duplex mode of the first network node to the half duplex mode; and causing sending, by the first network node, information on a changed duplex mode of the first network node to network nodes in duplex pairing relationship with the first network node.

8. A method according to claim 5, comprising:

receiving, in the first network node, a duplex pairing request from a relevant neighboring network node, wherein the duplex pairing request comprises duplex information of the relevant neighboring network node, the duplex information of the relevant neighboring network node comprising bidirectional transmission preference metric of the relevant neighboring network node and information on a current duplex mode of the relevant neighboring network node;

establishing, in the first network node, a duplex pairing relationship between the relevant neighboring network node and the first network node by storing duplex information of the relevant neighboring network node to the duplex pairing information of the first network node; and causing sending, in the first network node, duplex information of the first network node to the relevant neighboring network node, wherein the duplex information comprises a bidirectional transmission preference metric and information on a current duplex mode.

9. A method according to claim 1, wherein
the method is performed in a control network node;
the detecting the need to change the duplex mode for the first network node comprises
receiving, in a control network node, a duplex mode change query from the first network node, wherein the duplex mode change query comprises the bidirectional transmission preference metric of the first network node;
the causing changing the duplex mode of the first network node to the full duplex mode comprises:
causing sending, by the control network node, a request for changing the duplex mode from the half duplex mode to the full duplex mode to the first network node and
receiving, by the control network node, information on a changed duplex mode from the first network node; and
the causing, by the control network node, updating information on a current duplex mode of the first network node comprises
updating, in the control network node, the corresponding duplex information in the duplex pairing information of the first network node.

10. A method according to claim 9, further comprising:
if, according to the pre-defined rule, the first network node is not allowed to be in the full duplex mode, causing sending, by the control network node, a refusal message to the first network node.

11. A method according to claim 1, wherein the relevant neighboring network nodes for the first network node are determined based on a set of rules relating to measured link performance.

12. An apparatus comprising:
at least one processor, and
at least one memory comprising a computer program code, wherein the processor, the memory, and the computer program code are configured to cause the apparatus to:
detect a need to change a duplex mode of the apparatus from a half duplex mode to a full duplex mode;
determine one or more relevant neighboring network nodes including sending a duplex pairing request to a neighboring access node should duplex pairing information associated with the neighboring access node is unavailable in the memory for the first network node;
determine duplex pairing information of the apparatus, wherein the duplex pairing information of the apparatus comprises:
    duplex information of the one or more relevant neighboring network nodes, the duplex information comprising at least information on a current duplex mode of a corresponding neighboring network node, and
    bidirectional transmission preference metric of the apparatus and the duplex information of the one or more relevant neighboring network nodes further comprises bidirectional transmission preference metrics of the one or more neighboring network nodes;
use the duplex pairing information of the apparatus to determine duplex modes of the one or more relevant neighboring network nodes;
in response to all of the one or more relevant neighboring network nodes of the apparatus operating in the half duplex mode, cause changing the duplex mode of the apparatus to the full duplex mode; and
in response to the causing changing the duplex mode, cause updating information on a current duplex mode of the apparatus to the one or more relevant neighboring network nodes.

13. The apparatus according to claim 12, wherein the processor, the memory, and the computer program code are, in response to at least one of the one or more relevant neighboring network nodes of the apparatus operating in the full duplex mode, further configured to:
compare the bidirectional transmission preference metric of the apparatus and the bidirectional transmission preference metric of each of the one or more relevant neighboring network nodes operating in the full duplex mode, wherein the bidirectional transmission preference metric is at least one of a neighboring density metric and a metric for uplink/downlink traffic symmetry;
use a pre-defined rule to determine, based on the comparing, which ones of the apparatuses are allowed to operate in the full duplex mode; and
in response to at least one of the at least one of the one or more relevant neighboring network nodes of the apparatus operating in the full duplex mode being determined not to be allowed to be in the full duplex mode in response to the apparatus being allowed to be in the full duplex mode, causing sending a request for changing the duplex mode from the full duplex mode to the half duplex mode to each of the relevant neighboring network nodes operating in the full duplex mode that are determined not to be allowed to be in the full duplex mode, and in response to receiving a message confirming the change of the duplex mode to the half duplex mode from each of the at least one of the at least one of the one or more relevant neighboring network nodes determined not to be allowed to be in the full duplex mode, update the corresponding duplex information in the duplex pairing information, and
in response to the first network node being allowed to be in the full duplex mode according to the pre-defined rule, cause changing the duplex mode of the apparatus to the full duplex mode.

14. The apparatus according to claim 12, wherein the processor, the memory, and the computer program code are further configured to:
retrieve the duplex pairing information of the apparatus from a memory to determine the duplex pairing information of the apparatus.

15. The apparatus according to claim 14, wherein the processor, the memory, and the computer program code are, in the determining the duplex pairing information of the apparatus, further configured to:
in response to duplex information for at least one of the one or more relevant neighboring network nodes being unavailable in retrieved duplex pairing information, cause sending a duplex pairing request to the at least one of the one or more relevant neighboring network nodes of the apparatus; and
in response to receiving duplex pairing response comprising duplex information from the at least one of the one or more relevant neighboring network nodes, establish duplex pairing relationships between the apparatus and the at least one of the one or more relevant neighboring network nodes by storing the duplex information of the at least one of the one or more relevant neighboring network nodes to the memory.

16. The apparatus according to claim 15, wherein the processor, the memory, and the computer program code are further configured to cause sending in the duplex pairing request a bidirectional transmission preference metric of the apparatus and information on a current duplex mode of the apparatus.

17. The apparatus according to claim 12, wherein the processor, the memory, and the computer program code are further configured to in response to receiving from a relevant neighboring network node information on a changed duplex mode, update duplex information on the corresponding relevant neighboring network node in the duplex pairing information of the apparatus.

18. The apparatus according to claim 12, wherein the processor, the memory, and the computer program code are further configured to:

in response to receiving a request for changing the duplex mode from the full duplex mode to the half duplex mode, change the duplex mode of the apparatus to the half duplex mode, and cause sending information on a changed duplex mode of the apparatus to the one or more relevant neighboring network nodes in duplex pairing relationship with the apparatus.

19. The apparatus according to claim 12, wherein the processor, the memory, and the computer program code are further configured to in response to receiving a duplex pairing request from a relevant neighboring network node, the duplex pairing request comprising duplex information of the relevant neighboring network node, the duplex information of the relevant neighboring network node comprising bidirectional transmission preference metric of the relevant neighboring network node and information on a current duplex mode of the relevant neighboring network node, establish a duplex pairing relationship between the relevant neighboring network node and the apparatus by storing duplex information of the relevant neighboring network node to the duplex pairing information of the apparatus, and cause sending duplex information of the apparatus to the relevant neighboring network node, wherein the duplex information comprises a bidirectional transmission preference metric and information on a current duplex mode.

\* \* \* \* \*